(12) United States Patent
Yamazaki et al.

(10) Patent No.: US 9,939,528 B2
(45) Date of Patent: Apr. 10, 2018

(54) SAFETY SCANNER, OPTICAL SAFETY SYSTEM, AND SETTING SUPPORT DEVICE FOR SAFETY SCANNER

(71) Applicant: Keyence Corporation, Osaka (JP)

(72) Inventors: Kentaro Yamazaki, Osaka (JP);
Tsuyoshi Tagashira, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 15/410,795

(22) Filed: Jan. 20, 2017

(65) Prior Publication Data

US 2017/0242123 A1 Aug. 24, 2017

(30) Foreign Application Priority Data

Feb. 22, 2016 (JP) ................. 2016-031511

(51) Int. Cl.

| | | |
|---|---|---|
| *G01B 11/14* | (2006.01) | |
| *G01S 17/02* | (2006.01) | |
| *G01S 7/48* | (2006.01) | |
| *G01S 7/481* | (2006.01) | |
| *G01S 17/42* | (2006.01) | |
| *G06K 9/00* | (2006.01) | |
| *G08B 13/181* | (2006.01) | |
| *H04N 5/232* | (2006.01) | |
| *H04N 5/77* | (2006.01) | |
| *H04N 7/18* | (2006.01) | |

(52) U.S. Cl.
CPC .......... *G01S 17/023* (2013.01); *G01S 7/4808* (2013.01); *G01S 7/4817* (2013.01); *G01S 17/42* (2013.01); *G06K 9/00771* (2013.01); *G08B 13/181* (2013.01); *H04N 5/23293* (2013.01); *H04N 5/77* (2013.01); *H04N 7/183* (2013.01)

(58) Field of Classification Search
CPC ....... G01B 11/00; G01B 11/024; G01B 11/02; G01B 11/26; H05K 13/0413
USPC ........................................... 356/615
See application file for complete search history.

(56) References Cited

U.S. PATENT DOCUMENTS

| | | | |
|---|---|---|---|
| 6,616,044 B1 * | 9/2003 | Gu .................. | G06K 7/10584 235/462.14 |
| 7,598,484 B2 | 10/2009 | Yamaguchi | |
| 8,063,780 B2 | 11/2011 | Onishi | |
| 8,069,007 B2 | 11/2011 | Oh | |
| 8,248,235 B2 | 8/2012 | Inoue et al. | |
| 8,319,171 B2 | 11/2012 | Kawabata | |
| 8,330,095 B2 | 12/2012 | Kawabata | |

(Continued)

*Primary Examiner* — Tarifur Chowdhury
*Assistant Examiner* — Md M Rahman
(74) *Attorney, Agent, or Firm* — Kilyk & Bowersox, P.L.L.C.

(57) ABSTRACT

Provided is a safety scanner capable of facilitating an analysis of a sensing factor at the time of sensing an intruder. The safety scanner includes a monitoring image generation section that generates a monitoring image for monitoring a protection area, a sensing history storage section that stores a position and a sensing time of a sensed intruder and the monitoring image corresponding to the sensing time or a plurality of distance measurement information items obtained within a scanning period corresponding to the sensing time in association with each other as a sensing history, and a sensing history transmission section that transmits the sensing history in accordance with a history request from an external device.

13 Claims, 15 Drawing Sheets

(56) References Cited

U.S. PATENT DOCUMENTS

| | | |
|---|---|---|
| 8,415,609 B2 | 4/2013 | Kawabata et al. |
| 8,648,292 B2 | 2/2014 | Kawabata et al. |
| 2003/0179350 A1* | 9/2003 | Hecht ................ G06K 7/10584 353/122 |
| 2008/0158555 A1* | 7/2008 | Mori ....................... G01S 7/481 356/239.2 |
| 2009/0283666 A1 | 11/2009 | Tagashira |
| 2009/0295577 A1 | 12/2009 | Yamaguchi |
| 2010/0149330 A1* | 6/2010 | Salgar .............. G08B 13/19686 348/143 |
| 2015/0369618 A1* | 12/2015 | Barnard ............. H05B 37/0272 701/491 |
| 2016/0155306 A1 | 6/2016 | Kawanaka et al. |
| 2016/0163171 A1 | 6/2016 | Yamazaki et al. |
| 2017/0242099 A1 | 8/2017 | Yamazaki |
| 2017/0242101 A1 | 8/2017 | Oh |
| 2017/0242110 A1 | 8/2017 | Tomoshi et al. |
| 2017/0242111 A1 | 8/2017 | Tagashira et al. |

* cited by examiner

SAFETY SCANNER, OPTICAL SAFETY SYSTEM, AND SETTING SUPPORT DEVICE FOR SAFETY SCANNER

CROSS-REFERENCE TO RELATED APPLICATIONS

The present application claims foreign priority based on Japanese Patent Application No. 2016-031511, filed Feb. 22, 2016, the contents of which is incorporated herein by reference.

BACKGROUND OF THE INVENTION

1. Field of the Invention

The present invention relates to a safety scanner, an optical safety system, and a setting support device for a safety scanner, and, more particularly, to an improvement of an optical safety system that receives reflected light from an object to sense an intruder within a protection area.

2. Description of Related Art

An area monitoring sensor is a safety device which senses an intruder such as a person intruded into a protection area and outputs a safety control signal for emergently stopping a machine tool or an industrial robot (e.g., JP 2009-296087 A and JP 2009-294734 A).

For example, a safety scanner is an optical area monitoring sensor provided with a light emitting part which emits detection light toward an object, a light receiving part which receives reflected light from the object and generates a light receiving signal, a distance calculation part which obtains a distance to the object on the basis of the light receiving signal, and a scanning part which causes the detection light to perform scanning in the circumferential direction around a rotation axis. Sensing of an intruder is performed by identifying the position of an object from the distance to the object and a scanning angle of the detection light and checking the identified position against a protection area.

In a conventional safety scanner as described above, a position and a sensing time of a sensed intruder are recorded as a sensing history. It is possible to identify when and where the intruder has been sensed by analyzing the sensing history. However, disadvantageously, a state around the intruder cannot be grasped from such a sensing history. In particular, disadvantageously, a state before the time of sensing of the intruder and a state after the sensing time are uncertain, and it is difficult to identify what kind of intruder has intruded into the protection area and how the intruder has intruded into the protection area, or identify whether or not the intruder sensing is temporary sensing. Further, it is difficult to perform an analysis of a sensing factor such as whether or not the intruder sensing is caused by a positional deviation at the time of installation of the safety scanner or caused by setting error of the protection area.

For example, when the safety scanner is provided with a camera which captures an image of the protection area, a terminal device such as a personal computer may be connected to the safety scanner, and an image captured by the camera may be recorded by the terminal device. In the terminal device, an image at the time of sensing an intruder can be monitored. However, in a configuration that constantly records an image captured by the camera, it is extremely troublesome to find an image at the time of sensing an intruder from a huge amount of recorded data.

SUMMARY OF THE INVENTION

The present invention has been made in view of the above circumstances, and an object thereof is to provide a safety scanner, an optical safety system, and a setting support device for a safety scanner capable of facilitating an analysis of a sensing factor at the time of sensing an intruder.

Further, an object of the present invention is to provide a safety scanner capable of easily identifying a peripheral state before and after a sensing time. In particular, an object is to provide a safety scanner capable of facilitating identification of an installation state of the safety scanner and an intruder.

Further, an object of the present invention is to provide a setting support device for a safety scanner capable of facilitating a search for a sensing history. In particular, an object is to provide a setting support device for a safety scanner capable of facilitating viewing of two or more sensing histories having different sensing times.

According to one embodiment of the invention, a safety scanner includes a light emitting section that emits detection light toward an object; a light receiving section that receives reflected light from the object and generates a light receiving signal; a distance calculation section that obtains a distance to the object on the basis of the light receiving signal; a scanning section that causes the detection light to perform scanning in a circumferential direction around a rotation axis; an intrusion sensing section that senses an intruder within a protection area on the basis of distance measurement information that includes the distance and a scanning angle of the detection light; a monitoring image generation section that generates a monitoring image for monitoring the protection area; a sensing history storage section that stores a position and a sensing time of a sensed intruder and the monitoring image corresponding to the sensing time or a plurality distance measurement information items obtained within a scanning period corresponding to the sensing time in association with each other as a sensing history; and a sensing history transmission section that transmits the sensing history in accordance with a history request from an external device.

According to one embodiment of the invention, an optical safety system includes a light emitting section that emits detection light toward an object; a light receiving section that receives reflected light from the object and generates a light receiving signal; a distance calculation section that obtains a distance to the object on the basis of the light receiving signal; a scanning section that causes the detection light to perform scanning in a circumferential direction around a rotation axis; an intrusion sensing section that senses an intruder within a protection area on the basis of distance measurement information that includes the distance and a scanning angle of the detection light; a monitoring image generation section that generates a monitoring image for monitoring the protection area; a sensing history storage section that stores a position and a sensing time of a sensed intruder and the monitoring image corresponding to the sensing time or a plurality of distance measurement information items obtained within a scanning period corresponding to the sensing time in association with each other as a sensing history; and a sensing history display section that displays the sensing history on a screen in accordance with a history display instruction.

According to one embodiment of the invention, there is provided a setting support device for a safety scanner, the safety scanner including a light emitting section that emits detection light toward an object; a light receiving section that receives reflected light from the object and generates a light receiving signal; a distance calculation section that obtains a distance to the object on the basis of the light receiving signal; a scanning section that causes the detection light to perform scanning in a circumferential direction around a rotation axis; an intrusion sensing section that senses an intruder within a protection area on the basis of distance measurement information that includes the distance and a scanning angle of the detection light; a monitoring image generation section that generates a monitoring image for monitoring the protection area; and a sensing history storage section that stores a position and a sensing time of a sensed intruder and the monitoring image corresponding to the sensing time or a plurality of pieces of distance measurement information items obtained within a scanning period corresponding to the sensing time in association with each other as a sensing history, the setting support device including a sensing history acquisition section that acquires the sensing history from the safety scanner; and a sensing history display section that displays the sensing history on a screen in accordance with a history display instruction.

According to such a configuration, the monitoring image corresponding to the sensing time or the plurality of distance measurement information items obtained within the scanning period corresponding to the sensing time is recorded as the sensing history. Thus, a state around the intruder at the time of sensing the intruder can be grasped from the sensing history. Further, the monitoring image is stored in association with the position and the sensing time of the intruder. Thus, it is possible to easily find a monitoring image at the time of sensing the intruder according to the position and the sensing time of the intruder.

According to another embodiment of the invention, in the safety scanner, in addition to the above configuration, the monitoring image generation section generates, as the monitoring image, a scan image that includes a plurality of distance measurement information items obtained by performing scanning with the detection light, the plurality of distance measurement information items being represented as a plurality of distance measurement positions on a scanning plane of the detection light. According to such a configuration, it is possible to easily identify a peripheral state at the sensing time by checking the scan image stored as the sensing history.

According to still another embodiment of the invention, in the safety scanner, in addition to the above configuration, the monitoring image generation section includes a fixed camera that captures an image of the protection area to generate a camera image as the monitoring image. According to such a configuration, it is possible to easily identify a peripheral state at the sensing time by checking the camera image stored as the sensing history. For example, it is possible to easily identify what kind of intruder has intruded into the protection area or identify whether or not the intruder sensing is caused by a positional deviation at the time of installation of the safety scanner.

According to still another embodiment of the invention, in the safety scanner, in addition to the above configuration, the monitoring image is a moving image, and the sensing history storage section stores, as a sensing history, a monitoring image whose acquisition period includes a sensing time of an intruder. According to such a configuration, it is possible to easily identify a peripheral state before and after the sensing time. For example, it is possible to easily identify how the intruder has intruded into the protection area or identify whether or not the intruder sensing is temporal sensing.

According to still another embodiment of the invention, in the setting support device for a safety scanner, in addition to the above configuration, the sensing history display section includes a history list display section that displays a history list including two or more sensing histories having different sensing times, the two or more sensing histories being arrayed in the order of sensing time, and the history list display section displays, as a thumbnail image of a sensing history, a still image that constitutes the monitoring image and is acquired at the time of sensing an intruder in the history list. According to such a configuration, since the history list is displayed, it is possible to facilitate viewing of two or more sensing histories having different sensing times. Further, the thumbnail image at the time of sensing an intruder is displayed in the history list. Thus, it is possible to easily identify what kind of intruder has been sensed in the sensing history. Further, the sensing histories are arrayed in the order of sensing time. Thus, it is possible to easily find a desired sensing history.

According to still another embodiment of the invention, in addition to the above configuration, the setting support device for a safety scanner further includes a reference history selection section that selects any one of sensing histories in the history list as a reference history, and the sensing history display section displays a monitoring image corresponding to a sensing history selected as the reference history. According to such a configuration, it is possible to display a monitoring image corresponding to the reference history by selecting the reference history from the history list.

According to still another embodiment of the invention, in addition to the above configuration, the setting support device for a safety scanner further includes a monitoring image acquisition section that acquires a current monitoring image from the safety scanner and a sensing position display section that displays a position of an intruder sensed in the past on the current monitoring image on the basis of the sensing history. According to such a configuration, it is possible to easily compare the position of an intruder sensed in the past with the current distance measurement result. Further, it is possible to easily find a desired sensing history according to the position of the intruder.

According to still another embodiment of the invention, in the setting support device for a safety scanner, in addition to the above configuration, the monitoring image is a camera image captured by a fixed camera, and the sensing history display section displays the protection area on the camera image. According to such a configuration, the positional relationship between a subject and the protection area can be checked using the camera image. Thus, it is possible to easily identify whether or not the protection area has been correctly set. For example, it is possible to easily identify whether or not the intruder sensing is caused by setting error of the protection area.

According to still another embodiment of the invention, in the setting support device for a safety scanner, in addition to the above configuration, the sensing history acquisition section acquires a sensing history including a plurality of distance measurement information items obtained by performing scanning with the detection light from the safety scanner, and the sensing history display section displays a plurality of distance measurement positions corresponding to the plurality of distance measurement information items on the camera image. According to such a configuration, it is possible to easily identify the boundary of the detection area by the distance measurement positions on the camera image.

According to still another embodiment of the invention, in addition to the above configuration, the setting support device for a safety scanner further includes a display image generation section that generates a detail check image and a privacy image having a lower image quality than the detail check image for display and a display image selection section that selects either the detail check image or the privacy image as a display image, the sensing history display section displays a display image selected by the display image selection section as the camera image, and the display image selection section selects the detail check image as a display image when user authentication is successful and selects the privacy image as a display image when user authentication is unsuccessful or a user is unauthenticated. According to such a configuration, it is possible to protect privacy of an operator who is included in the camera image or conceal security information by displaying the privacy image. On the other hand, the environment around the safety scanner and a subject can be analyzed in detail by displaying the detail check image.

According to still another embodiment of the invention, in addition to the above configuration, the setting support device for a safety scanner further includes a selection tab display section that displays a display target selection tab for selecting a measurement unit to be a display target, the safety scanner being connected includes two or more measurement units, each of the measurement units includes the light emitting section, the light receiving section, the distance calculation section, the scanning section, and the fixed camera, and the sensing history display section displays a sensing history corresponding to the measurement unit selected by operating the display target selection tab. According to such a configuration, it is possible to select any one of the measurement units as a display target and display the corresponding sensing history by operating the display target selection tab.

According to the present invention, a monitoring image corresponding to a sensing time or a plurality of distance measurement information items obtained within a scanning period corresponding to the sensing time is recorded as a sensing history. Thus, it is possible to provide the safety scanner, the optical safety system, and the setting support device for a safety scanner that facilitate an analysis of a sensing factor at the time of sensing an intruder. Further, according to the present invention, it is possible to easily identify a peripheral state before and after the sensing time by checking a monitoring image stored as a sensing history. In particular, it is possible to facilitate identification of an installation state of the safety scanner and an intruder.

Further, according to the present invention, since the history list is displayed, it is possible to facilitate a search for a sensing history. In particular, it is possible to facilitate viewing of two or more sensing histories having different sensing times.

DETAILED DESCRIPTION OF PREFERRED EMBODIMENT

<Optical Safety System 1>

Figure 1:
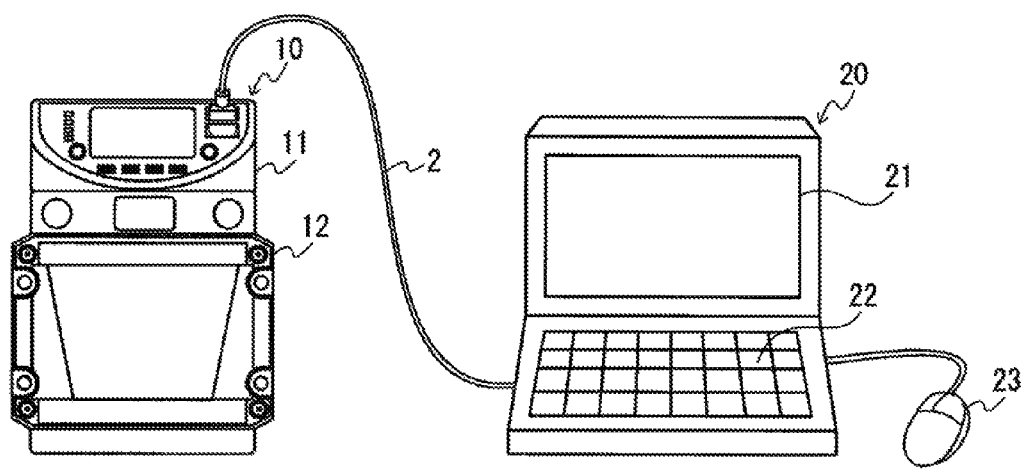
FIG. 1 is a system diagram illustrating a configuration example of an optical safety system according to an embodiment of the present invention.

FIG. 1 is a system diagram illustrating a configuration example of an optical safety system 1 according to an embodiment of the present invention. The optical safety system 1 includes the safety scanner 10 which senses an intruder within a protection area and outputs a sensing signal, and a setting support device 20 which creates setting data including the protection area. The safety scanner 10 and the setting support device 20 are connected to each other through a communication cable 2.

The sensing signal is a safety control signal for emergently stopping a machine such as a machine tool or an industrial robot. The sensing signal is output to a safety control device (not illustrated) which controls the machine, for example, to a programmable logic controller (PLC). The operation of a machine as a control target of the safety control device can be stopped by switching an output state of the sensing signal to an off state.

The protection area is a monitoring target area of intruder sensing. For example, an area around machinery and equipment such as a work area of a machine tool or an industrial robot or a moving area of a conveyance vehicle is designated as the protection area.

The safety scanner 10 is an optical scanning safety sensor which optically senses an intruder within the protection area, and includes a display unit 11 and a measurement unit 12. The display unit 11 is a user interface which receives a user operation and displays, for example, an operating state and setting data and provided with a connection port for the communication cable 2 and an output port for a safety control signal.

The measurement unit 12 is a sensor head unit which emits detection light to a detection area and receives reflected light from an object within the detection area to sense an intruder. The detection area is the largest area detectable by the measurement unit 12. The protection area is an area designated within the detection area. The measurement unit 12 is provided with a rotary optical system which causes the detection light to perform scanning in the circumferential direction around a rotation axis and a camera which captures an image of the protection area to generate a camera image.

A warning area can be set to the safety scanner 10 in addition to the protection area. When the safety scanner 10 senses an intruder within the warning area, the safety scanner 10 outputs an auxiliary output signal and performs user notification by, for example, lighting an indicator lamp.

For example, the measurement unit 12 is placed on a horizontal floor surface. The display unit 11 includes an output signal switching device (OSSD). When no intruder is present within the protection area, the OSSD is in an on state, and a sensing signal of an on state is output. On the other hand, when an intruder is present within the protection area, the OSSD is in an off state, and a sensing signal of an off state is output.

The setting support device 20 is an information processing terminal, for example, a personal computer which is provided with a display 21, a keyboard 22, and a mouse 23. For example, the setting support device 20 creates setting data for designating the protection area and a measurement condition. Further, the setting support device 20 performs an operation of acquiring distance measurement information and a camera image from the safety scanner 10 and displaying the acquired information and image on the display 21.

For example, the setting support device 20 can be achieved by operating a computer in accordance with a setting support program for the safety scanner. Such a setting support program is recorded in a computer readable recording medium such as a CO-ROM to be provided or provided through a network.

<Safety Scanner 10>

Figure 2:
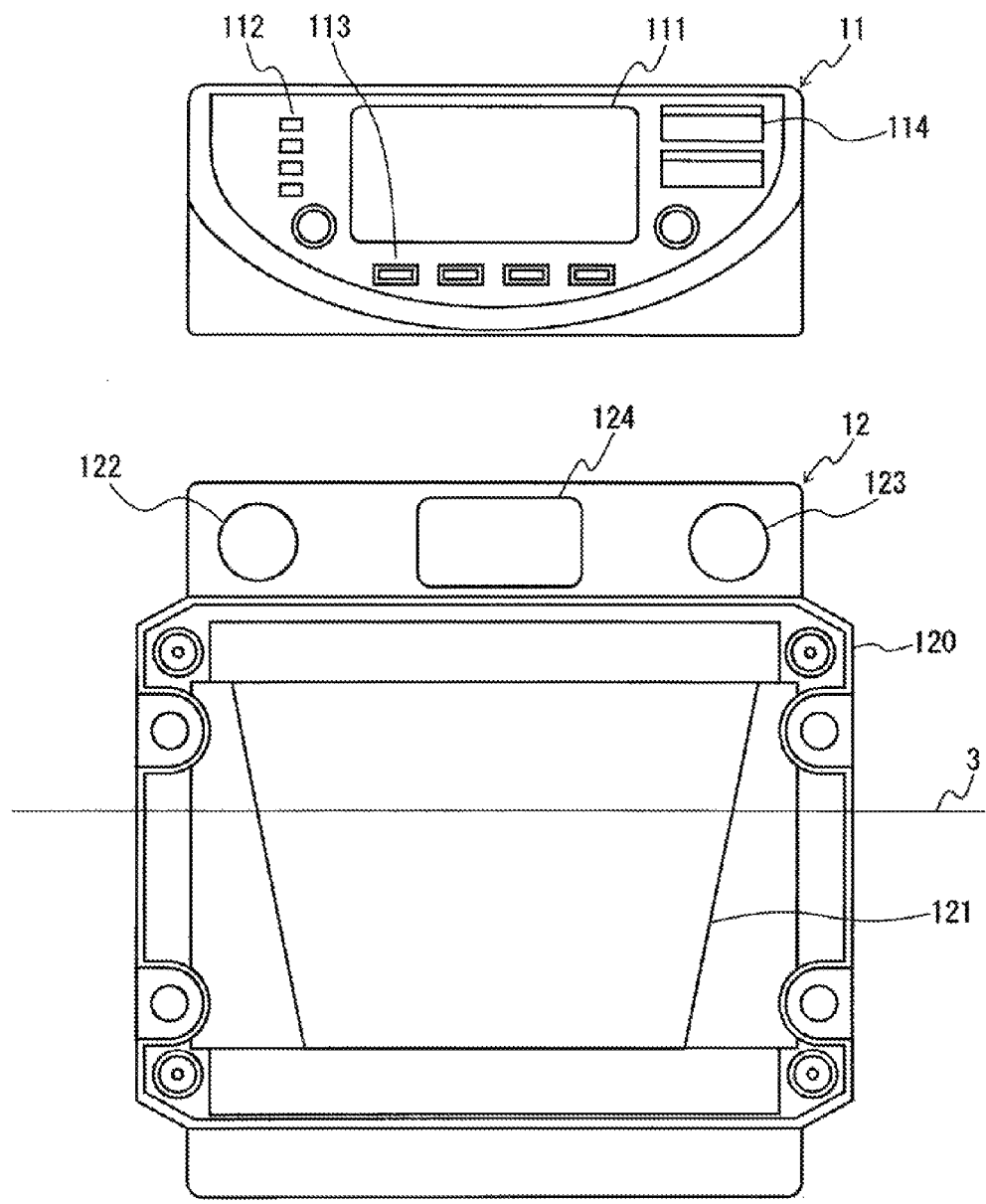
FIG. 2 is a diagram illustrating a configuration example of a safety scanner of FIG. 1.

FIG. 2 is a diagram illustrating a configuration example of the safety scanner 10 of FIG. 1 and illustrates a separate type safety sensor which includes the display unit 11 separable from the measurement unit 12. FIG. 2 illustrates the safety scanner 10 viewed from the front side. The display unit 11 and the measurement unit 12 are connected to each other through a wiring cable (not illustrated). Two or more measurement units 12 can be connected to the display unit 11 at the same time.

A scanner casing 120 of the measurement unit 12 houses the rotary optical system which emits detection light in the horizontal direction and causes the detection light to perform scanning along a horizontal scanning plane 3, and a protective cover 121 for protecting the rotary optical system is attached to a housing part for the rotary optical system. The scanning plane 3 is a plane perpendicular to the rotation axis of the rotary optical system.

For example, laser light having a wavelength in an infrared range is used as the detection light. The detection light repeatedly performs scanning at a constant scanning period. The scanner casing 120 is provided with two fixed cameras 122 and 123, and an indicator 124 which indicates an output state of the sensing signal. The fixed cameras 122, 123 and the indicator 124 are disposed above the housing part for the rotary optical system.

Both the fixed cameras 122 and 123 are imaging devices which capture an image of the protection area to generate a camera image as a monitoring image and disposed with different orientations. The fixed camera 122 is disposed on the left side with respect to the indicator 124 when viewed from the side facing the measurement unit 12. On the other hand, the fixed camera 123 is disposed on the right side with respect to the indicator 124 when viewed from the side facing the measurement unit 12. That is, the fixed cameras 122 and 123 are disposed at different positions in the circumferential direction with respect to the rotation axis of the rotary optical system. The fixed camera 122 is a camera whose angle of view includes a right side area with respect to the front-rear direction viewed from the measurement unit 12, and the fixed camera 123 is a camera whose angle of view includes a left side area with respect to the front-rear direction viewed from the measurement unit 12. The fixed cameras 122 and 123 are disposed above the scanning plane 3 and thus capable of obtaining a camera image of a bird's eye view of the scanning plane 3.

The indicator 124 is an indicator lamp which indicates an output state and an operating state of the sensing signal. The indicator 124 is lit in different colors according to the output state of the sensing signal. For example, the indicator 124 is lit in red when the OSSD is in an off state and lit in green when the OSSD is in an on state.

The display unit 11 is disposed on the upper face of the measurement unit 12. The display unit 11 is provided with a display panel 111, an indicator 112, an operation key 113, and a cable connection port 114.

The display panel 111 is a display device which screen-displays, for example, an operating state, distance measurement information, a camera image, and setting data. For example, the display panel 111 is a liquid crystal display (LCD) panel. The indicator 112 is an indicator lamp for indicating, for example, an operating state and an output state of the sensing signal. The cable connection port 114 is an input/output terminal part to which the communication cable 2 is detachably connected. The display unit 11 communicates with the measurement unit 12 and is capable of checking the monitoring target area and a sensing history of an intruder even when placed at a position away from the measurement unit 12.

<Measurement Unit 12>

Figure 3:
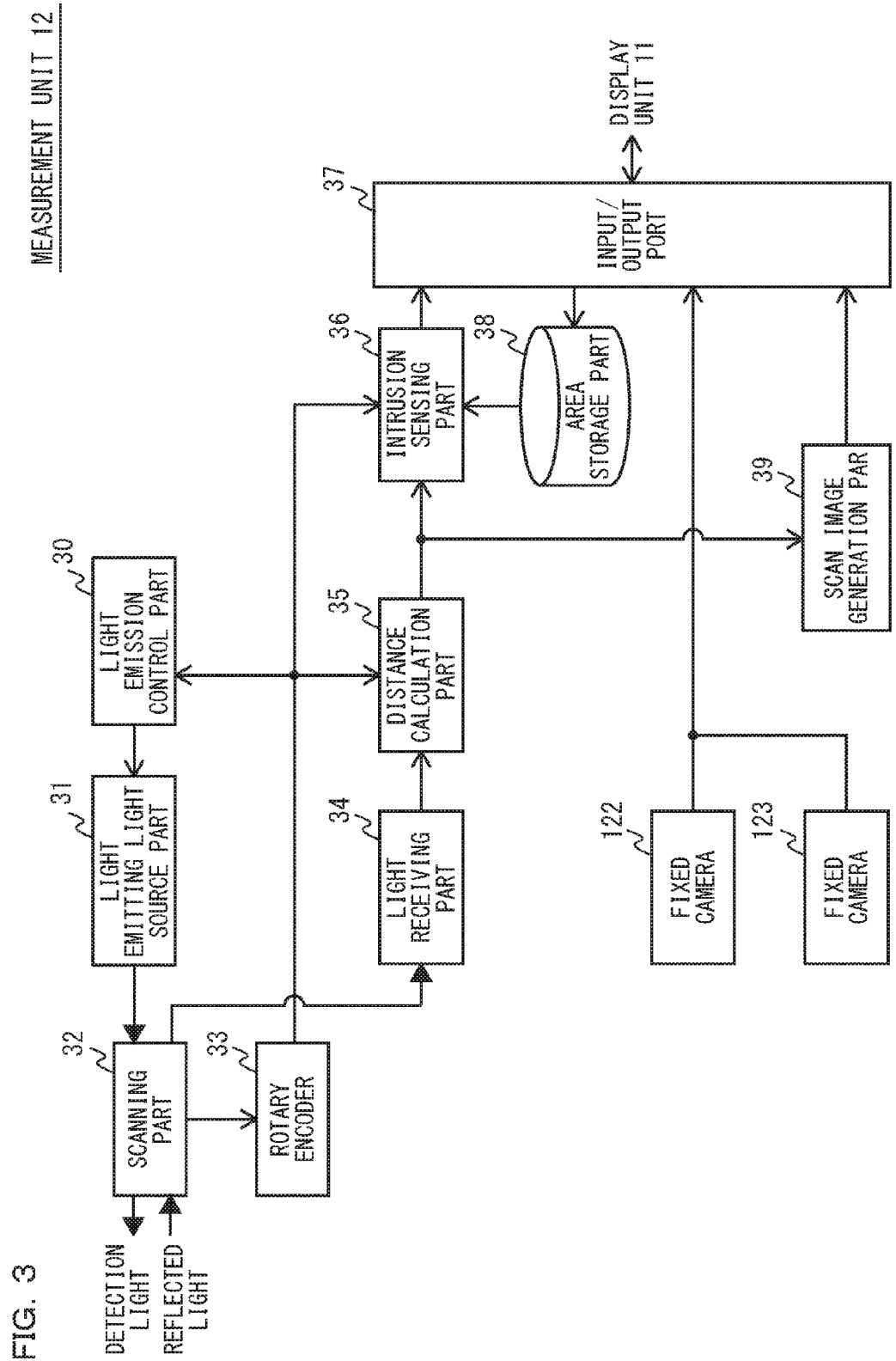
FIG. 3 is a block diagram illustrating an example of a functional configuration in a measurement unit of FIG. 2.

FIG. 3 is a block diagram illustrating an example of a functional configuration in the measurement unit 12 of FIG. 2. The measurement unit 12 includes a light emission control part 30, a light emitting light source part 31, a scanning part 32, a rotary encoder 33, a light receiving part 34, a distance calculation part 35, an intrusion sensing part 36, an input/output port 37, an area storage part 38, a scan image generation part 39, and fixed cameras 122 and 123.

The light emitting light source part 31 includes a light emitting element such as a laser diode (LD) or a light emitting diode (LED) and generates detection light. The light emission control part 30 controls the light emitting light source part 31 so that the light emitting light source part 31 generates pulse-like detection light at a constant time interval. The scanning part 32 includes the rotary optical system which emits the detection light toward an object and causes the detection light to perform scanning in the circumferential direction around the rotation axis and a drive part which rotates the rotary optical system around the rotation axis. For example, the rotary optical system of the scanning part 32 includes an emitter mirror which reflects the detection light toward an object, a receiver lens which receives reflected light from the object, and a receiver mirror which reflects the reflected light transmitted through the receiver lens toward a light receiving element.

The light receiving part 34 includes a light receiving element such as a photodiode (PD), and receives reflected light from an object and generates a light receiving signal. The rotary encoder 33 is a rotation detection device which detects a rotation of the rotary optical system and generates a pulse signal whose pulse repetition interval corresponds to a rotation speed. The light emission control part 30 controls the light emitting light source part 31 on the basis of the pulse signal of the rotary encoder 33 to adjust an emission timing of the detection light. For example, every time the rotary optical system of the scanning part 32 rotates by 360/1000°, the detection light is emitted.

The distance calculation part 35 obtains a distance to the object on the basis of the light receiving signal from the light receiving part 34. The distance calculation part 35 is a distance measurement part which performs distance measurement by a time of flight (TOF) system. The distance calculation part 35 compares the light receiving signal with a pulse signal of the rotary encoder 33 and identifies a delay time between when detection light is emitted and when reflected light corresponding to the detection light is received to calculate the distance to the object as a detection distance.

The intrusion sensing part 36 senses an intruder within the protection area on the basis of distance measurement information which includes the detection distance obtained by the distance calculation part 35 and a scanning angle of the detection light, and outputs a sensing signal. The scanning angle of the detection light is identified on the basis of the pulse signal of the rotary encoder 33. Further, whether or not an intruder is present within the protection area is determined by identifying a two-dimensional position of the intruder from the detection distance and the scanning angle of the detection light and checking the identified two-dimensional position against positional information of the protection area.

The sensing signal is transmitted to the display unit 11 through the input/output port 37. The input/output port 37 is a communication interface part which communicates with the display unit 11, and receives setting data from the display unit 11 and transmits an operating state, distance measurement information, a sensing signal, a scan image, and a camera image to the display unit 11. The area storage part 38 holds positional information indicating the two-dimensional position of the monitoring target area such as the protection area. The positional information of the monitoring target area is acquired from the display unit 11 through the input/output port 37.

The scan image generation part 39 generates a scan image on the basis of distance measurement information which includes a scanning angle and a detection distance that are acquired at the time of detecting reflected light. The scan image is formed by two-dimensionally displaying a plurality of distance measurement information items obtained within a scanning period of the detection light. Each of the distance measurement information items is represented as a distance measurement position on the scanning plane 3 identified by the scanning angle and the detection distance. The scanning plane 3 is a plane perpendicular to the rotation axis of the rotary optical system of the scanning part 32. The scan image generation part 39 generates a moving scan image as a monitoring image and updates the scan image synchronously with the scanning period of the detection light.

A scan image and camera images captured by the fixed cameras 122 and 123 are transmitted to the display unit 11 through the input/output port 37. The intrusion sensing part 36 transmits sensing information which includes a position of the sensed intruder (sensing position) and a time when the intruder is sensed (sensing time) to the display unit 11. For example, an operating time from when a main power is turned on can be used as the sensing time.

Although there is described an example of the safety scanner 10 in which one measurement unit 12 is connected to one display unit 11, a configuration in which a plurality of measurement units 12 can be connected to one display unit 11 may be employed. In this case, the OSSD of the display unit 11 is turned on when all the target measurement units 12 confirm that the OSSD should be turned on in the respective protection areas, and turned off in the other cases. The scan image generation part 39 provided in the measurement unit 12 enables the load of a scan image generation process to be distributed.

<Display Unit 11>

Figure 4:
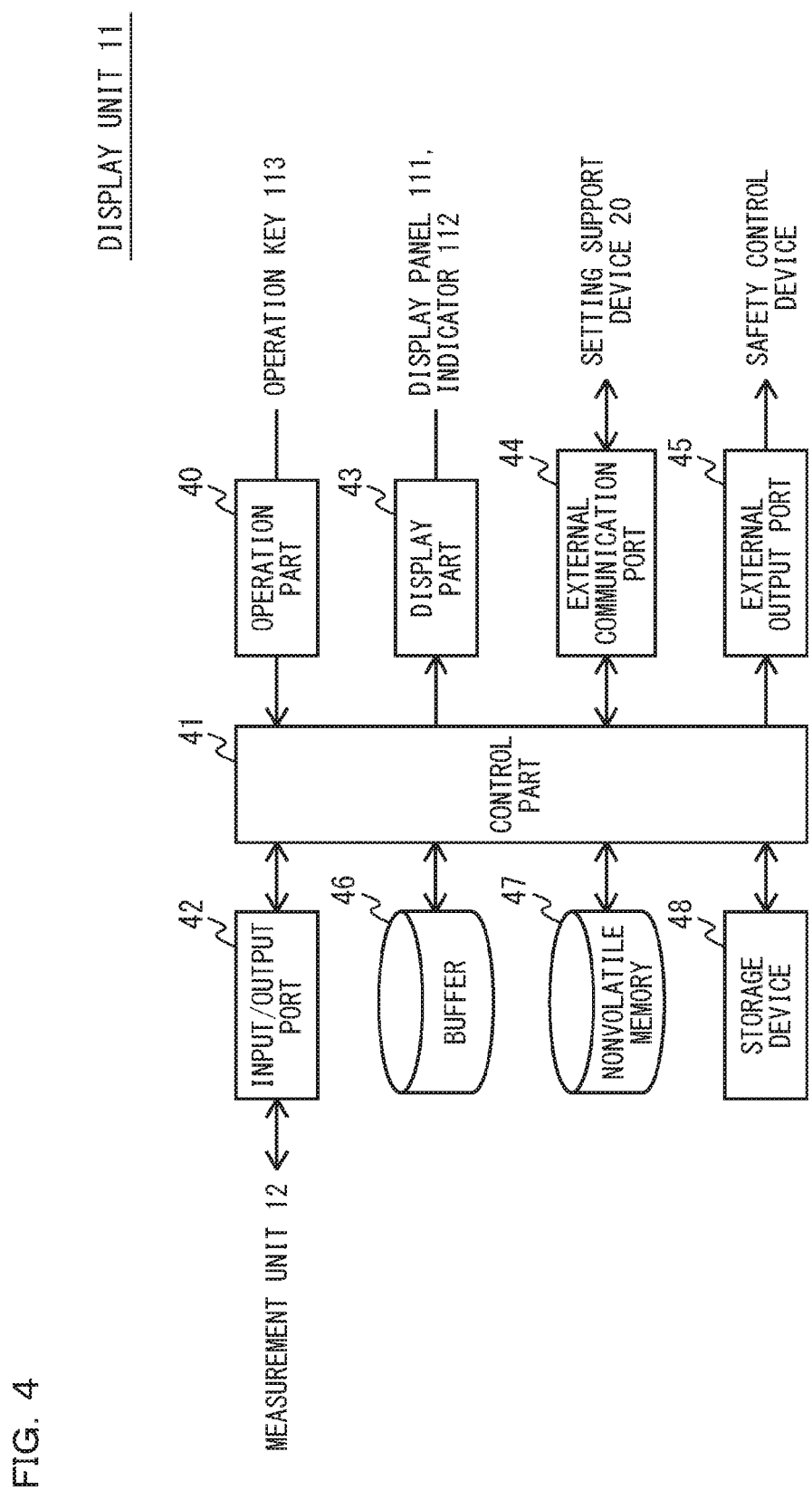
FIG. 4 is a block diagram illustrating an example of a functional configuration in a display unit of FIG. 2.

FIG. 4 is a block diagram illustrating an example of a functional configuration in the display unit 11 of FIG. 2. The display unit 11 includes an operation part 40, a control part 41, an input/output port 42, a display part 43, an external communication port 44, an external output port 45, a buffer 46, a nonvolatile memory 47, and a storage device 48.

The input/output port 42 is a communication interface part which communicates with the measurement unit 12, and transmits setting data to the measurement unit 12 and receives an operating state, distance measurement information, a sensing signal, a scan image, and a camera image from the measurement unit 12.

The external communication port 44 is a communication interface part which communicates with the setting support device 20, and receives setting data from the setting support device 20 and transmits an operating state, distance measurement information, a scan image, and a camera image to the setting support device 20. The external output port 45 is an interface part which outputs an output signal (an on state or an off state) of the OSSD to the safety control device as a sensing signal (safety control signal). Note that the external output port 45 may be configured to transmit an output signal (an on state or an off state) of the OSSD to the safety control device as a sensing signal (safety control signal) by two-way communication with the safety control device.

The operation part 40 generates an operation signal in accordance with a depression operation of the operation key 113 and outputs the operation signal to the control part 41. The display part 43 drives the display panel 111 and the indicator 112 to display setting data, an operating state, distance measurement information, a scan image, and a camera image on the display panel 111 and indicates an operating state on the indicator 112.

The control part 41 acquires distance measurement information, a scan image, and a camera image from the measurement unit 12 and stores the acquired information and images in the buffer 46. When data accumulated in the buffer 46 exceeds a certain amount, the control part 41 overwrites the oldest data and stores new data. The buffer 46 is a volatile storage element for temporary recording which is incorporated in the safety scanner 10.

Further, the control part 41 acquires sensing information of an intruder from the measurement unit 12 and generates a sensing history on the basis of the sensing information. The sensing history includes a position of the sensed intruder (sensing position), a time when the intruder is sensed (sensing time), and a monitoring image corresponding to the sensing time, and these sensing information items are associated with each other and stored as the sensing history.

The monitoring image recorded as the sensing history includes a still image which is acquired immediately before or after the sensing time and a moving image whose acquisition period includes the sensing time. For example, the moving image is acquired around the sensing time and have a certain time length. Further, camera images captured by the fixed cameras 122 and 123 and a scan image generated by the scan image generation part 39 are used as these monitoring images.

For example, a user can select, in any manner, whether either a still image or a moving image is recorded as a sensing history or whether either a camera image or a scan image is recorded as a sensing history. A state before and after the sensing time can be easily identified by recording a moving monitoring image as a sensing history. On the other hand, the number of sensing histories that can be stored in the nonvolatile memory 47 can be increased by recording a still monitoring image as a sensing history.

The nonvolatile memory 47 is a nonvolatile storage element incorporated in the safety scanner 10. The nonvolatile memory 47 holds a sensing history created by the control part 41. The nonvolatile memory 47 is a sensing history storage section which stores a sensing position, a sensing time, and a monitoring image corresponding to the sensing time in association with each other as a sensing history. When area setting or a setting bank is changed, the control part 41 deletes the corresponding sensing history.

Instead of recording a scan image as a sensing history, a plurality of distance measurement information items obtained within a scanning period corresponding to the sensing time may be recorded as a sensing history, and, when the sensing history is displayed, a scan image may be created from the plurality of distance measurement information items recorded as the sensing history and displayed.

Further, warning related information may also be recorded as a sensing history in addition to information relating to a sensing signal (OSSD). The warning related information is information which is recorded in relation to an operation of performing user notification for warning when a predetermined sensing event occurs, and an occurrence time of the sensing event, the contents of the sensing event, and a warning factor are recorded as the sensing history.

The sensing event includes, for example, sensing of ambient light based on a light receiving signal from the light receiving part 34, sensing of a high reflector based on a light receiving signal from the light receiving part 34, sensing of dirt on the protective cover 121, sensing of an overcurrent in an output line of the safety scanner 10, and sensing of an object within the warning area. Note that the warning related information recorded as a sensing history may include a monitoring image (a still image or a moving image) corresponding to the occurrence time of the sensing event. Further, a user may be able to select, in any manner, whether or not warning related information of the monitoring image is recorded as a sensing history.

The storage device 48 includes a nonvolatile storage element and is detachably attached to the display unit 11. The storage device 48 holds setting data acquired from the setting support device 20. Note that the storage device 48 may hold the sensing history.

The control part 41 reads a sensing history from the nonvolatile memory 47 in accordance with a history request from the setting support device 20 and transmits the read sensing history to the setting support device 20 through the external communication port 44. Although there is described an example of the safety scanner 10 in which the scan image generation part 39 is provided in the measurement unit 12, the scan image generation part 39 may be provided in the display unit 11 instead of this configuration. Alternatively, the scan image generation part 39 may be provided in each of the display unit 11 and the measurement unit 12. In this case, distance measurement information is transmitted and received between the measurement unit 12 and the display unit 11 instead of a scan image. Thus, even when a communication speed is low, a scan image is easily displayed.

<Monitor Screen and History Screen>

Figure 5:
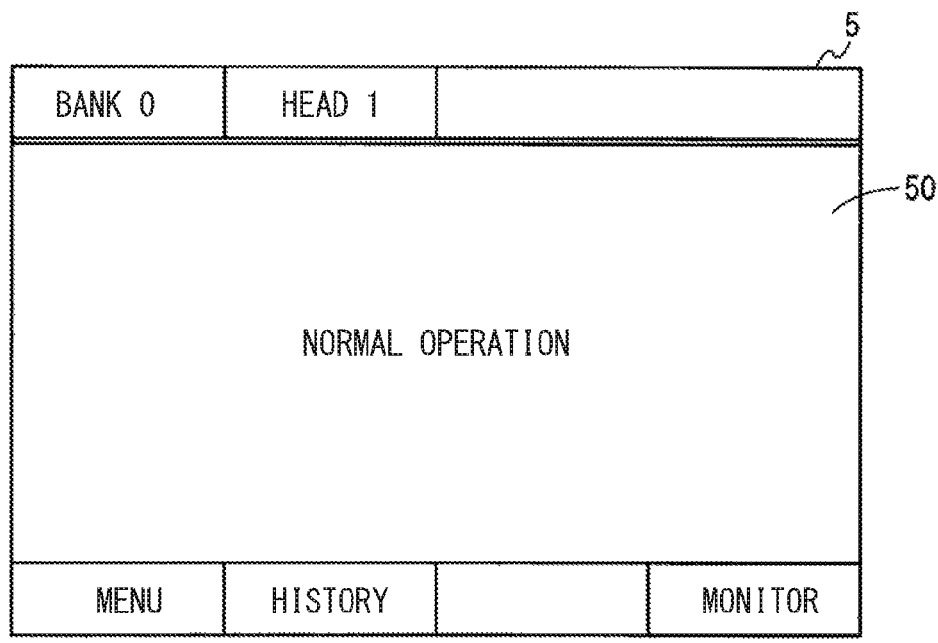
FIG. 5 is a diagram illustrating an example of the operation of the display unit of FIG. 4 and illustrates a monitor screen displayed on a display panel.

FIGS. 5 to 8 are diagrams illustrating an example of the operation of the display unit 11 of FIG. 4. FIG. 5 illustrates a monitor screen 5 displayed on the display panel 111. The monitor screen 5 is a state display screen for displaying an operating state of the safety scanner 10, and a character string of "NORMAL OPERATION" which indicates an operating state is displayed in a main display field 50. It is possible to identify whether the current operating state is a normal operating state or an error state from the monitor screen 5.

When a plurality of measurement units 12 are connected to the display unit 11, an operating state of one of the measurement units 12 selected as a display target is displayed on the monitor screen 5. Further, when the monitoring target area and the measurement condition are registered as a setting bank, and a bank function of switchably holding a plurality of setting banks is enabled, a bank number which indicates a setting bank applied to the display target measurement unit 12 is displayed within the monitor screen 5.

Switching to a menu screen, a history screen, or another monitor screen can be performed by operating the operation key 113. The menu screen is a screen for checking, for example, an error history, a parameter set as the measurement condition, and the monitoring target area. The history screen is a screen for displaying a sensing history of intruder sensing.

Figure 6A:
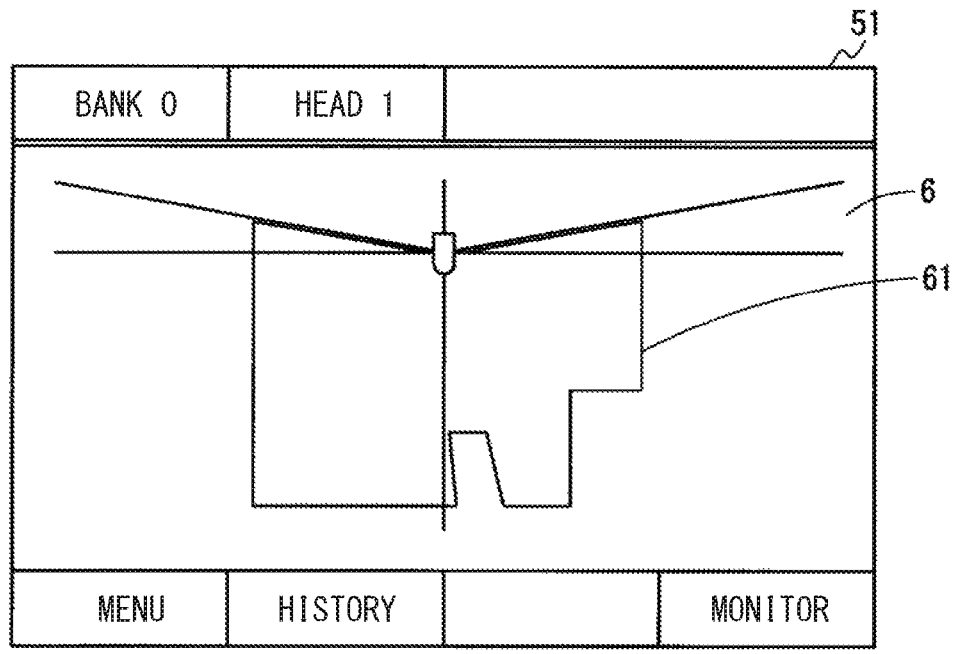
FIGS. 6A and 6B are diagrams illustrating an example of the operation of the display unit of FIG. 4 and illustrate a distance measurement monitor screen and a camera monitor screen.
Figure 6B:
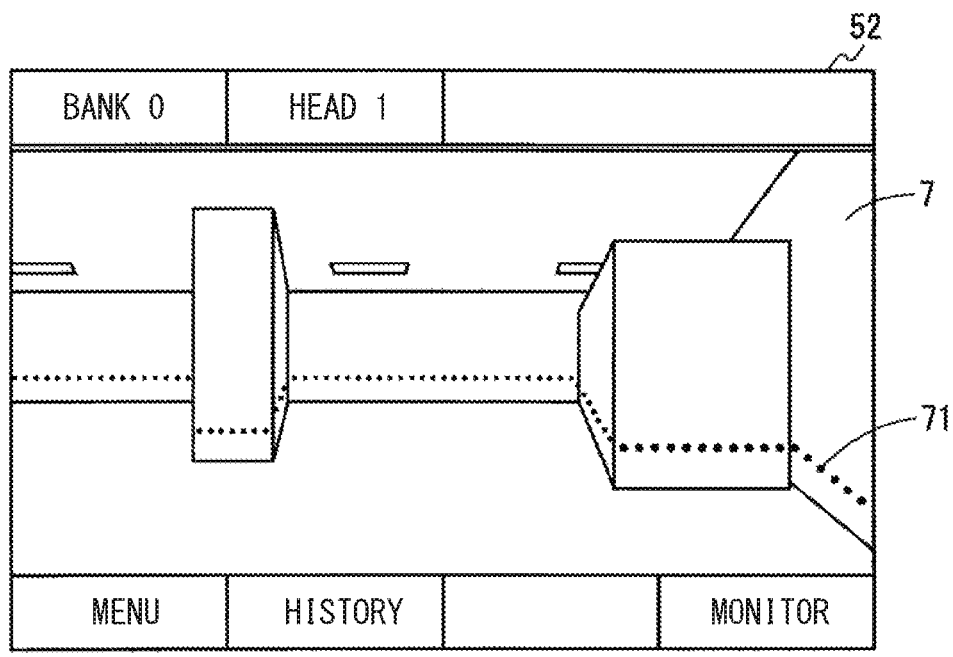

FIGS. 6A and 6B illustrate a distance measurement monitor screen 51 and a camera monitor screen 52. FIG. 6A illustrates the distance measurement monitor screen 51 which displays a scan image 6. In this example, the scan image 6 is drawn with the lower direction of the distance measurement monitor screen 51 aligned with the front direction of the measurement unit 12.

The scan image 6 is a distance measurement line image formed by displaying a distance measurement line 61 which connects a plurality of distance measurement positions obtained within the scanning period of the detection light on the scanning plane 3, and the current state around the measurement unit 12 is displayed as a moving image. The scan image 6 which is being displayed can be rotated or a display magnification thereof can be changed by operating the operation key 113.

FIG. 6B illustrates the camera monitor screen 52 which displays a camera image 7. The camera image 7 is a captured image captured by the fixed camera 122 or 123, and the current state around the measurement unit 12 is displayed as a moving image. In this example, a captured image acquired from the fixed camera 123 is displayed on the camera monitor screen 52 as the camera image 7.

The camera image 7 is displayed with the right-left direction in the camera image aligned with the right-left direction in the scan image 6. Further, a plurality of distance measurement positions 71 which are obtained within the scanning period of the detection light are displayed on the camera image 7. The camera image 7 which is being displayed can be right-left reversed or a visual point thereof can be changed by operating the operation key 113.

Figure 7A:
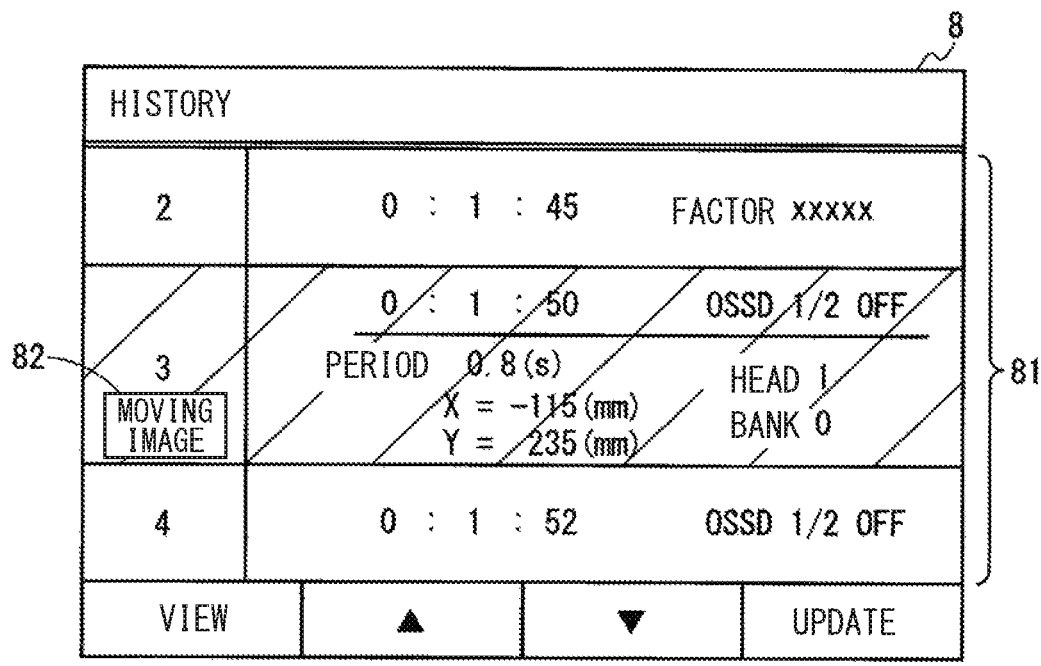
FIGS. 7A and 7B are diagrams illustrating an example of the operation of the display unit of FIG. 4 and illustrate a history screen displayed on the display panel.
Figure 7B:
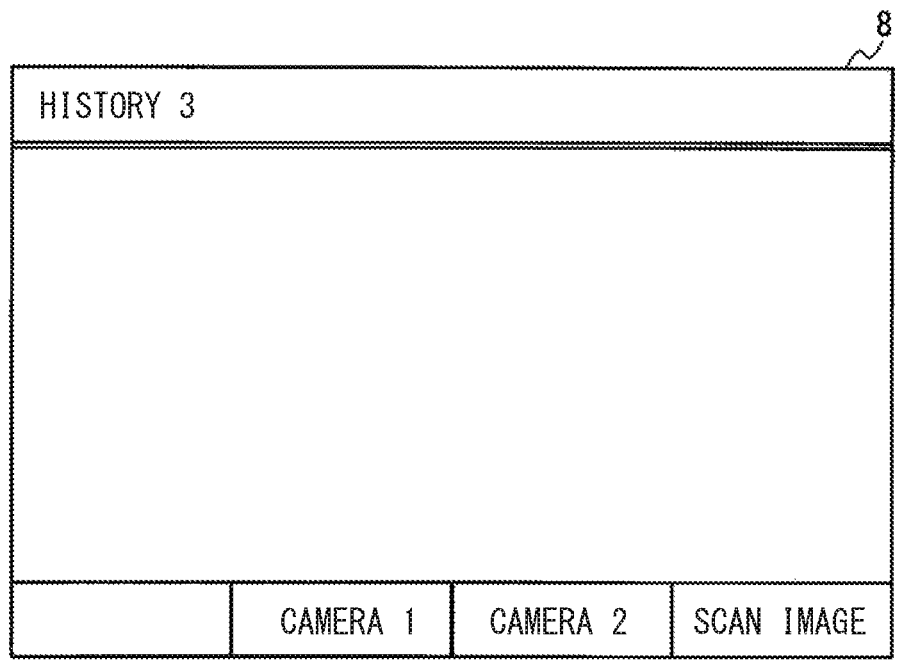

FIGS. 7A and 7B illustrate a history screen 8 which is displayed on the display panel 111. FIG. 7A illustrates the history screen 8 which displays a history list 81 including a plurality of sensing histories. The history list 81 is a listing object in which two or more sensing histories having different sensing times are arrayed in the order of sensing time, and sensing information is displayed in association with each of the sensing histories.

For example, the history list 81 is partially displayed on the history screen 8 and can be scrolled up or down by operating the operation key 113. In this example, three sensing histories are arrayed in the up-down direction, and one of the sensing histories selected as a reference history is arranged on the center thereof. The reference history is displayed in a focused or highlighted manner.

A history number which indicates a sensing order, a sensing time, a sensing factor, a sensing period, a sensing position, a head number, and a bank number are displayed in the reference history. Further, an icon 82 which indicates that a moving monitoring image or a still monitoring image is recorded as a sensing history is displayed in the reference history which includes the scan image 6 or the camera image 7. On the other hand, a history number, a sensing time, and a sensing factor are displayed in a sensing history other than the reference history.

The scan image 6 and the camera image 7 of the sensing history selected as the reference history can be checked by operating the operation key 113. Further, the reference history can be shifted to a sensing history located before or after thereof by operating the operation key 113. Further, it is possible to acquire sensing information from the measurement unit 12 and update the sensing history in the nonvolatile memory 47 by operating the operation key 113.

FIG. 7B illustrates the history screen 8 which is displayed when a sensing history "HISTORY 3" is selected as the reference history. An icon for selecting a monitoring image recorded as a sensing history is displayed on the history screen 8. Either the camera image 7 captured by the fixed camera 122 or 123 or the scan image 6 can be reproduced by operating the operation key 113. When a still monitoring image is recorded as a sensing history, the still monitoring image is displayed within the history screen 8.

Figure 8A:
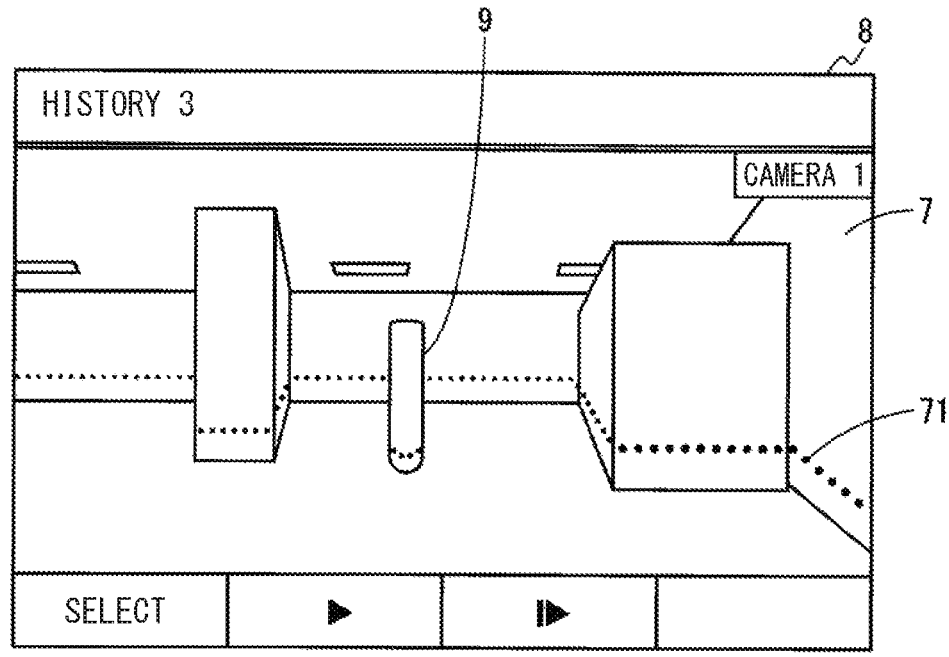
FIGS. 8A and 8B are diagrams illustrating an example of the operation of the display unit of FIG. 4 and illustrate a case in which a camera image and a scan image each of which is recorded as a sensing history are reproduced.
Figure 8B:
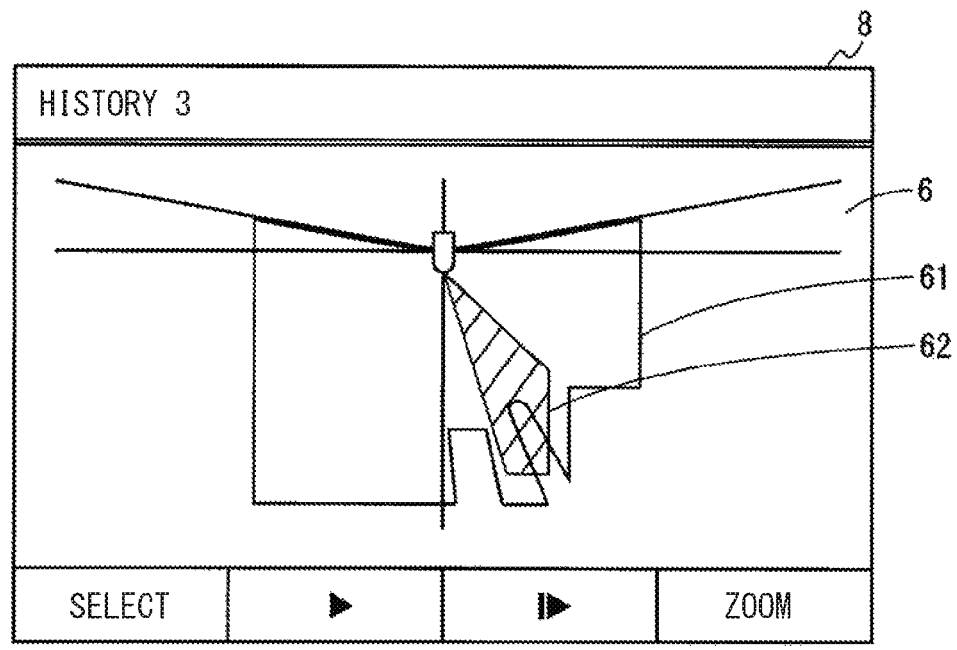

FIGS. 8A and 8B illustrate a case in which the camera image 7 and the scan image 6 each of which is recorded as a sensing history are reproduced. FIG. 8A illustrates the history screen 8 which reproduces the camera image 7 captured by the fixed camera 123 "CAMERA 1".

The camera image 7 includes a sensed intruder 9 as a subject in addition to the distance measurement positions 71. It is possible to start reproduction of a moving image, or temporarily stop or frame-by-frame advance a moving image being reproduced by operating the operation key 113. Further, another camera image 7 or scan image 6 can be selected by operating the operation key 113. Note that an image on which the distance measurement positions 71 are superimposed is used as the camera image 7 which is recorded as a sensing history. Alternatively, a camera image with no distance measurement position 71 superimposed thereon and the corresponding distance measurement positions 71 may be associated with each other and recorded as a sensing history, and the camera image 7 may be displayed with the distance measurement positions superimposed thereon when the sensing history is displayed.

FIG. 8B illustrates the history screen 8 which reproduces the scan image 6. A figure representing the protection area 62 is drawn on the scan image 6 in addition to the distance measurement line 61. It is possible to start reproduction of a moving image, or temporarily stop or frame-by-frame advance a moving image being reproduced by operating the operation key 113. Further, it is possible to select the camera image 7 or change the display magnification by operating the operation key 113.

Figure 9A:
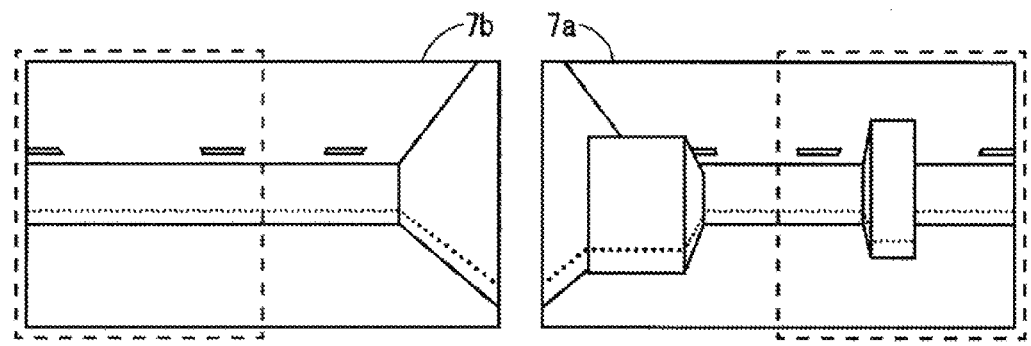
FIGS. 9A and 9B are diagrams illustrating an example of the operation of the display unit of FIG. 4 and illustrate a case in which two camera images are displayed side by side in a main display field.
Figure 9B:
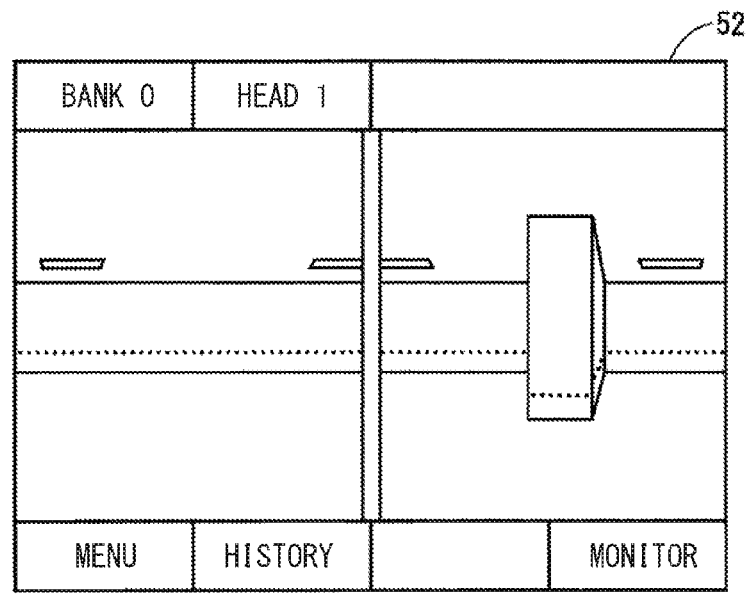

FIGS. 9A and 9B are diagrams illustrating an example of the operation of the display unit 11 of FIG. 4 and illustrate a case in which two camera images 7a and 7b are displayed side by side in the main display field. FIG. 9A illustrates the camera images 7a and 7b which are respectively captured by the fixed cameras 122 and 123. FIG. 9B illustrates the camera monitor screen 52 in which the camera images 7a and 7b are partially cut out and arranged in the main display field.

Either the camera image 7b which is captured by the fixed camera 122 (the left camera when viewed from the side facing the measurement unit 12) or the camera image 7a which is captured by the fixed camera 123 (the right camera when viewed from the side facing the measurement unit 12) can be switchably displayed in the main display field of the camera monitor screen 52.

Further, a region on the front side of the measurement unit 12 may be cut out from each of the camera images 7a and 7b, and the two cut-out partial images may be right-left reversed and displayed side by side in the main display field (FIG. 9B).

In this case, the left region of the camera image 7b which is captured by the left camera when viewed from the side facing the measurement unit 12 is arranged on the left side of the main display field, and the right region of the camera image 7a which is captured by the right camera when viewed from the side facing the measurement unit 12 is arranged on the right side of the main display field. A state of the measurement unit 12 in the front direction is easily intuitively recognized by such a coupling display function of the camera images 7a and 7b.

<Setting Support Device 20>

Figure 10:
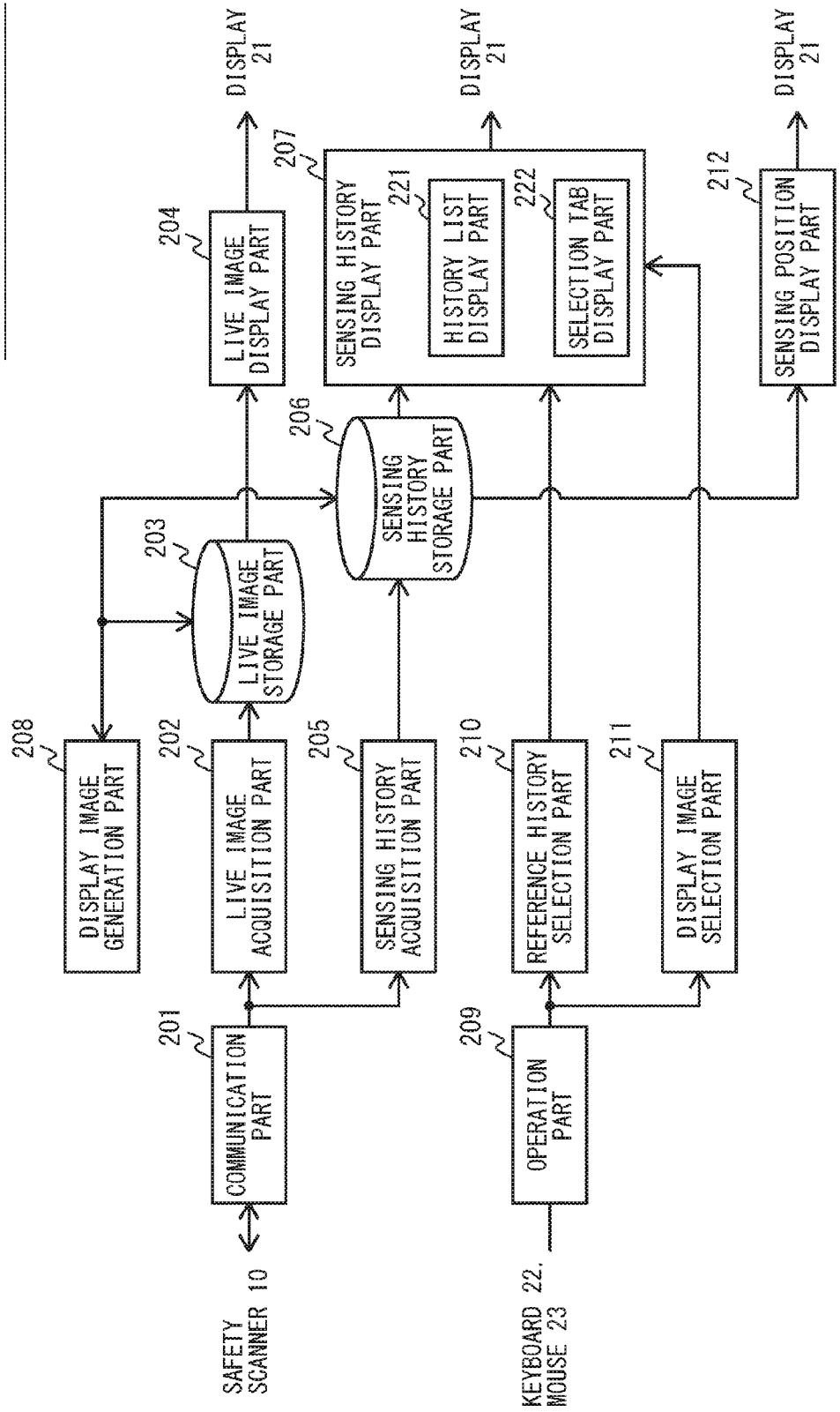
FIG. 10 is a block diagram illustrating an example of a functional configuration in a setting support device of FIG. 1.

FIG. 10 is a block diagram illustrating an example of a functional configuration in the setting support device 20 of FIG. 1. The setting support device 20 includes a communication part 201, a live image acquisition part 202, a live image storage part 203, a live image display part 204, a sensing history acquisition part 205, a sensing history storage part 206, a sensing history display part 207, a display image generation part 208, an operation part 209, a reference history selection part 210, a display image selection part 211, and a sensing position display part 212. The sensing history display part 207 includes a history list display part 221 and a selection tab display part 222.

The communication part 201 is an interface part which communicates with the display unit 11 of the safety scanner 10, and transmits setting data to the safety scanner 10 and receives an operating state, distance measurement information, a scan image, a camera image, and a sensing history from the safety scanner 10. The operation part 209 generates an operation signal in accordance with an operation of the keyboard 22 and the mouse 23 and outputs the operation signal to the reference history selection part 210 and the display image selection part 211.

The live image acquisition part 202 acquires current distance measurement information and current monitoring images (the camera image and the scan image) from the safety scanner 10 through the communication part 201 and stores the acquired information and images in the live image storage part 203. The distance measurement information and the monitoring images in the live image storage part 203 are updated synchronously with the scanning period of the safety scanner 10. Note that the distance measurement information and the monitoring images may be updated at a constant period asynchronously with the scanning period of the safety scanner 10.

The live image display part 204 drives the display 21 on the basis of image data in the live image storage part 203 and displays the current monitoring images on the system screen. The scan image and the camera image as the monitoring images are simultaneously displayed or individually displayed within the system screen.

The scan image is a moving image which is updated at a constant frame rate corresponding to the scanning period of the detection light. The live image display part 204 updates the scan image being displayed on the system screen synchronously with the scanning period of the safety scanner 10. The camera image is a moving image which is updated at a constant frame rate. The live image display part 204 updates the camera image being displayed on the system screen at a constant frame rate.

For example, the frame rate of the camera image is 8 fps (frames per second). The frame rate of the scan image is substantially equal to the frame rate of the camera image. For example, the frame rate of the scan image is 8 to 20 fps.

When the live image display part 204 displays at least two camera images which are captured by different cameras, specifically, the fixed cameras 122 and 123 on the system screen together with the scan image, the live image display part 204 displays the camera images in a manner to align the right-left direction in the camera images with the right-left direction in the scan image. Further, the live image display part 204 arranges the camera images in such a manner that the arrangement in the right-left direction of the camera images within the screen corresponds to the arrangement of the fixed cameras in the scan image.

The sensing history acquisition part 205 acquires a sensing history from the safety scanner 10 through the communication part 201 and stores the acquired sensing history in the sensing history storage part 206. The sensing history display part 207 drives the display 21 on the basis of data in the sensing history storage part 206 and displays the sensing history on the system screen. The sensing history is displayed in accordance with a predetermined history display instruction.

The history list display part 221 displays a history list in which two or more sensing histories having different sensing times are arrayed in the order of sensing time on the system screen. The history list display part 221 displays a still image that constitutes a monitoring image and is acquired at the time of sensing an intruder in the history list as a thumbnail image of the sensing history.

It is possible to facilitate viewing of two or more sensing histories having different sensing times by displaying such a history list. Further, a thumbnail image at the time of sensing an intruder is displayed in the history list. Thus, it is possible to easily identify what kind of intruder has been sensed in the sensing history. Further, the sensing histories are arrayed in the order of sensing time. Thus, a desired sensing history can be easily found.

The reference history selection part 210 selects any one of the sensing histories in the history list in accordance with a user operation. The sensing history display part 207 reproduces a monitoring image corresponding to the sensing history selected as the reference history. A monitoring image corresponding to the reference history can be reproduced by selecting the reference history from the history list.

The sensing position display part 212 displays the position of an intruder sensed in the past on the current monitoring image on the basis of the sensing history in the sensing history storage part 206. Further, the sensing history display part 207 displays a figure representing the protection area on the camera image. Further, the sensing history display part 207 displays a plurality of distance measurement positions corresponding to a plurality of distance measurement information items on the camera image.

A parameter which associates a position within the angle of view of the cameras 122 and 123 with the scanning angle of the detection light is held by the safety scanner 10. The setting support device 20 acquires the parameter from the safety scanner 10 and displays the protection area and the distance measurement position on the camera image.

When two or more measurement units 12 are connected to the display unit 11 in common, the selection tab display part 222 displays a display target selection tab for selecting one of the display target measurement units 12 on the system screen. The sensing history display part 207 displays a sensing history corresponding to the measurement unit 12 selected by operating the display target selection tab on the system screen.

The display image generation part 208 generates a detail check image and a privacy image for display on the basis of a camera image acquired from the safety scanner 10. The detail check image is a display image which is obtained by reducing the size of a camera image captured by the camera 122 or 123. The privacy image is a display image which makes an operator himself/herself or security information difficult to identify and obtained by reducing the image quality so as to be lower than the image quality of the detail check image.

Various image filters can be employed in filter processing for obtaining the privacy image. For example, mosaic processing is performed on a camera image in such a manner that an image region is divided into many processing blocks, and a pixel value is replaced with a representative value for each pixel in the processing block to reduce a physical resolution so as to blur the image.

The shape and size of the processing block and the arrangement mode of the processing blocks can be designated in any manner. The representative value is a pixel value representing the processing block, and determined by an average value, a median value, or a mode value of pixel values relating to the pixels in the processing block.

The display image selection part 211 selects either the detail check image or the privacy image as a display image. The sensing history display part 207 displays the display image selected by the display image selection part 211 as a camera image. The live image display part 204 displays the display image selected by the display image selection part 211 as a camera image.

The display image selection part 211 selects the detail check image as a display image when a user authentication is successful. On the other hand, the display image selection part 211 selects the privacy image as a display image when user authentication is unsuccessful or a user is unauthenticated. The user authentication is performed by acquiring registration information for authentication from the safety scanner 10 and checking the acquired registration information against input information of a password. Although there is described an example in which a privacy setting function is enabled, a user may be able to set enabling or disabling of the privacy setting function in any manner. When the privacy setting function is set to be disabled, the detail check image is automatically selected as a display image without performing user authentication.

<System Screen 230>

Figure 11:
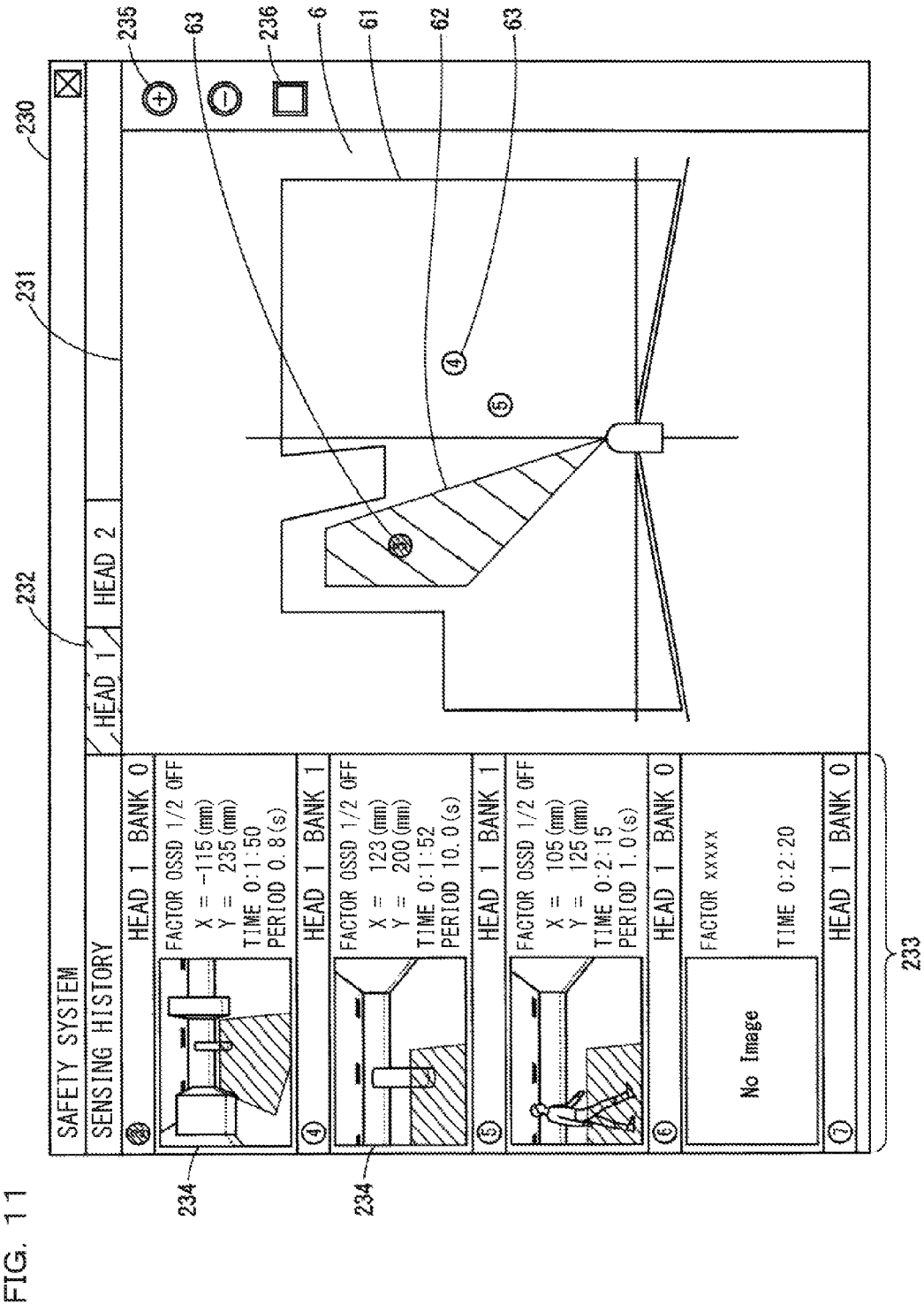
FIG. 11 is a diagram illustrating an example of the operation of the setting support device of FIG. 10 and illustrates a system screen for viewing a sensing history.

FIG. 11 is a diagram illustrating an example of the operation of the setting support device 20 of FIG. 10 and illustrates a system screen 230 for viewing a sensing history. The system screen 230 is a screen for setting the operation of the safety scanner 10 and checking an operating state and distance measurement information of the safety scanner 10, and displayed on the display 21.

The system screen 230 is a screen for viewing a sensing history acquired from the safety scanner 10 and is provided with an image display region 231, and a display target selection tab 232 and a history list 233 are displayed thereon. The current scan image 6 is displayed in the image display region 231. The display target selection tab 232 is disposed above the image display region 231. The history list 233 is disposed on the left side with respect to the image display region 231.

The scan image 6 in the image display region 231 is a distance measurement line image formed by drawing the distance measurement line 61 on the scanning plane 3. In this example, the scan image 6 is drawn with the upper direction of the system screen 230 aligned with the front direction of the measurement unit 12. The distance measurement line 61 is a figure representing the boundary of the detection area and includes a polygonal line formed by plotting a distance measurement position corresponding to the detection distance for each constant scanning angle. Orthogonal coordinates which include the measurement unit 12 as an origin point, a y axis aligned with the front-rear direction, and an x axis aligned with the right-left direction are indicated on the scan image 6, and a figure representing the protection area 62 is superimposed on the scan image 6.

The image display region 231 includes a scaling button 235 and a full screen button 236 which are disposed adjacent to the scan image 6. The scaling button 235 is an operation icon for enlarging or reducing the scan image 6. The full screen button 236 is an operation icon for displaying the entire scan image 6 in the image display region 231.

The history list 233 is a listing object in which two or more sensing histories having different sensing times are arrayed in the order of sensing time, and sensing information is displayed in association with each of the sensing histories. For example, the history list 233 is partially displayed and can be scrolled by a user operation. A history number which indicates a sensing order, a sensing time, a sensing factor, a sensing period, a sensing position, a head number, and a bank number are displayed in each of the sensing histories. Further, a thumbnail image 234 is displayed in the sensing history which includes the scan image 6 or the camera image 7.

The thumbnail image 234 is a display image which is created on the basis of a still image that constitutes a monitoring image and corresponds to a still image acquired at the time of sensing an intruder. Further, the thumbnail image 234 is a camera image which is obtained by capturing an image of the sensed intruder as a subject.

The display target selection tab 232 is an operation icon for selecting the display target measurement unit 12. It is possible to select any measurement unit 12 as a display target and display the corresponding camera image and scan image in the image display region 231 by operating the display target selection tab 232. In this example, sensing histories corresponding to a measurement unit "HEAD 1" which is selected as a display target are displayed as the history list 233.

Further, a history number 63 is displayed on the scan image 6 in the image display region 231 at the position of an intruder sensed in the past. The position of the intruder sensed in the past can be easily compared with the current distance measurement result by displaying the history number 63 on the scan image 6. Further, a desired sensing history can be easily found according to the position of the intruder.

In the history list 233, four sensing histories are arrayed in the up-down direction, and one of the sensing histories selected as the reference history is displayed in a focused or highlighted manner. The history number of the reference history is displayed in a color different from the color of the other sensing histories.

Figure 12:
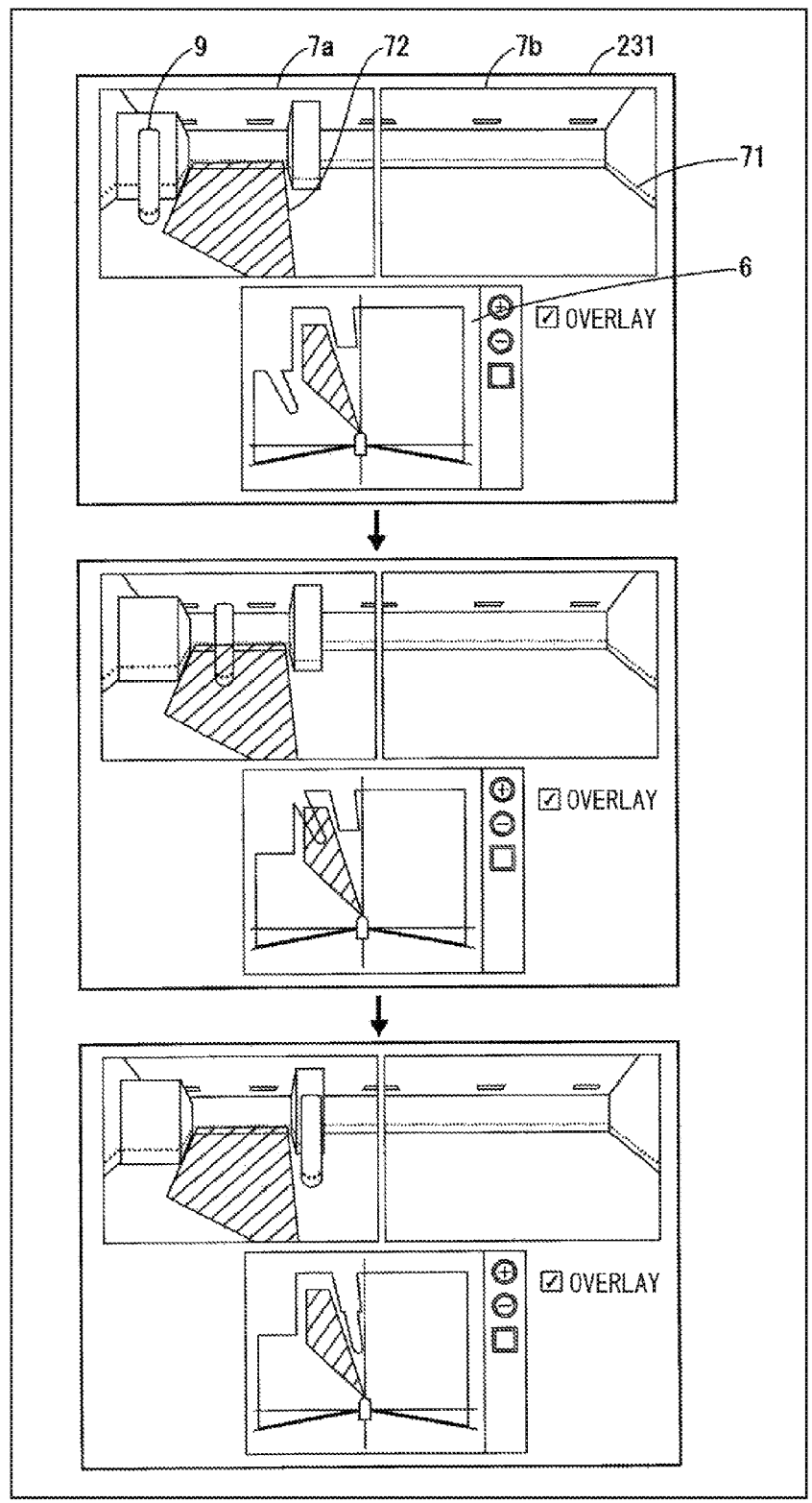
FIG. 12 is a diagram illustrating an example of the operation of the setting support device of FIG. 10 and illustrates a case in which a monitoring image recorded as a sensing history is reproduced.

FIG. 12 is a diagram illustrating an example of the operation of the setting support device 20 of FIG. 10 and illustrates a case in which a monitoring image recorded as a sensing history is reproduced. FIG. 12 illustrates the camera images 7a, 7b and the scan image 6 during moving image reproduction. The camera images 7a, 7b and the scan image 6 are simultaneously displayed in the image display region 231 of the system screen 230.

The scan image 6 is drawn with the upper direction of the system screen 230 aligned with the front direction of the measurement unit 12. Further, the scaling button and the full screen button are disposed adjacent to the scan image 6.

A check box for selecting an area overlay display function of displaying a protection area 72 on the camera images 7a and 7b is disposed in the image display region 231. A figure representing the protection area 72 can be displayed in a superimposed manner on the camera images 7a and 7b which are being displayed on the system screen 230 by inputting a check mark to the check box. The positional relationship between a subject and the protection area 72 can be checked using the camera images 7a and 7b by displaying the protection area 72 on the camera images 7a and 7b. Thus, it is possible to easily identify whether or not the protection area 72 has been correctly set.

The camera image 7a is a captured image which is captured by the camera 123 whose image capturing direction corresponds to the left region on the front side when the measurement unit 12 is viewed from the upper side. On the other hand, the camera image 7b is a captured image which is captured by the camera 122 whose image capturing direction corresponds to the right region on the front side when the measurement unit 12 is viewed from the upper side.

Each of the camera images 7a and 7b includes mechanical equipment, or a wall, a ceiling or a floor surface of a building as a subject. The distance measurement positions 71 and the protection area 72 are superimposed on the camera images 7a and 7b. The distance measurement positions 71 include many dots formed by plotting a distance measurement position corresponding to the detection distance for each constant scanning angle. The distance measurement positions 71 having such a configuration are displayed by identifying the position of an object in a three-dimensional space on the basis of the detection distance and the scanning angle of the detection light and identifying the two-dimensional position of the object in the camera images 7a and 7b on the basis of the positional relationship between the three-dimensional position and the angle of view of the cameras 122, 123. The position of the scanning plane 3 and the boundary of the detection area can be easily identified by the distance measurement positions 71 on the camera images 7a and 7b.

In the camera images 7a and 7b, a display mode of the distance measurement positions 71, for example, the color of the dots differs between the inside and the outside of the protection area 72. For example, the distance measurement positions 71 are displayed in red inside the protection area 72, and the distance measurement positions 71 are displayed in green outside the protection area 72. The intruder 9 within the protection area 72 can be easily identified by changing the display mode of the distance measurement positions 71 in this manner.

Each of the camera images 7a and 7b is displayed with the right-left direction aligned with the right-left direction in the scan image 6. When the scan image 6 is displayed with the front direction of the measurement unit 12, that is, the positive direction of the y axis corresponding to the upper side of the system screen 230, each of the camera images 7a and 7b is displayed in such a manner that the left region in the image corresponds to the left region of the scan image 6, and the right region in the image corresponds to the right region of the scan image 6.

Further, each of the camera images 7a and 7b is displayed in such a manner that the arrangement in the right-left direction in the system screen 230 corresponds to the arrangement of the fixed cameras 122 and 123 in the scan image 6. For example, the camera image 7a corresponds to the fixed camera 123 which captures an image of the left region of the scan image 6 and is disposed on the left side in the system screen 230. On the other hand, the camera image 7b corresponds to the fixed camera 122 which captures an image of the right region of the scan image 6 and is disposed on the right side in the system screen 230.

It is possible to start reproduction of a moving image, temporarily stop a moving image being reproduced, or frame-by-frame advance or return a moving image being reproduced by a predetermined operation. It is possible to grasp a state immediately before sensing of an intruder, a state at the time of the sensing of the intruder, and a state immediately after the sensing of the intruder by checking the camera images 7a, 7b or the scan image 6.

It is possible to recognize that an object located on the upper left side of the measurement unit 12 has passed through the protection area by watching the scan image 6. Further, it is possible to recognize that a rod-like object has passed through the protection area 72 by watching the camera image 7a. Since the camera images 7a, 7b and the scan image 6 are simultaneously displayed within the same screen, it is possible to easily identify the positional relationship between an environment around the safety scanner 10 and a scanning range of the detection light. The camera images 7a, 7b and the scan image 6 can also be individually displayed by selecting the image as a display target.

Figure 13:
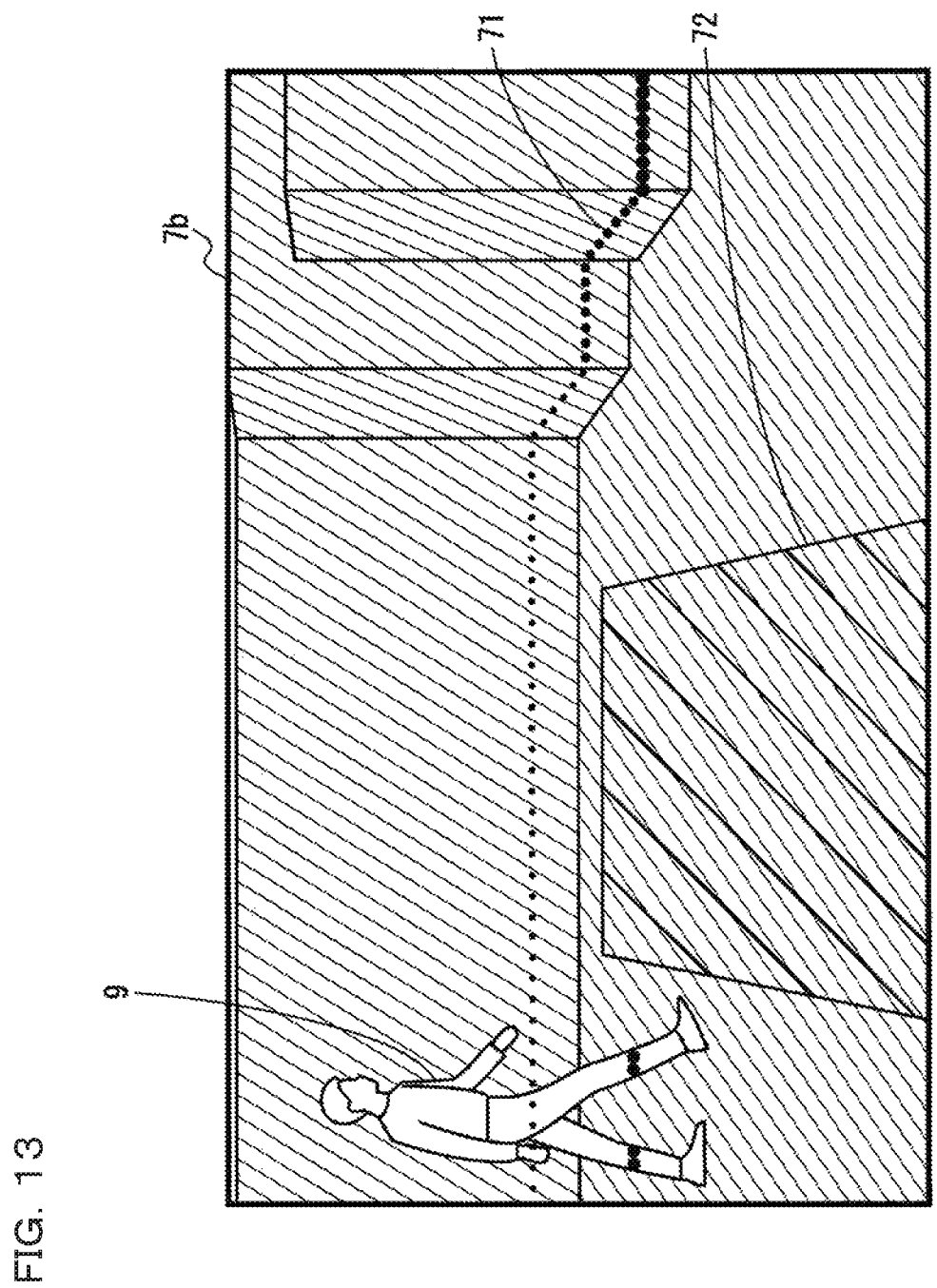
FIG. 13 is a diagram illustrating an example of the operation of the setting support device of FIG. 10 and illustrates a case in which a detail check image is displayed as a camera image.
Figure 14:
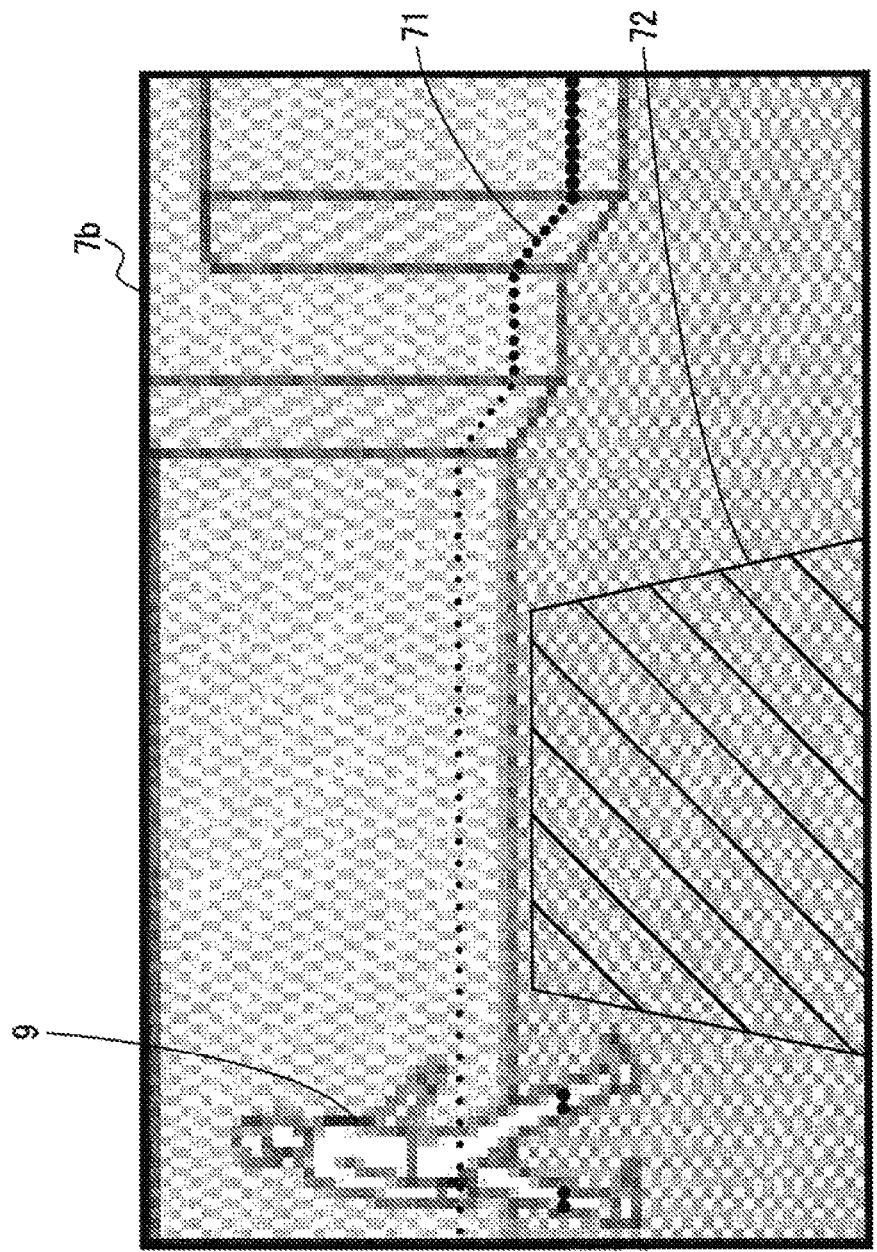
FIG. 14 is a diagram illustrating an example of the operation of the setting support device of FIG. 10 and illustrates a case in which a privacy image is displayed as a camera image.

FIGS. 13 and 14 illustrate an example of the operation of the setting support device 20 of FIG. 10 and illustrate a case in which the privacy protection function is selected. FIG. 13 illustrates a case in which the detail check image is displayed on the system screen 230 as the camera image 7b. FIG. 14 illustrates a case in which the privacy image is displayed on the system screen 230 as the camera image 7b.

The privacy image is a display image having a lower image quality than the detail check image and created by mosaic processing of reducing the resolution of the camera image. In this example, mosaic processing is applied to the entire image.

Privacy of an operator who is included in the camera image 7b as the intruder 9 can be protected or security information can be concealed by displaying such a privacy image. On the other hand, the environment around the safety scanner 10 and the subject can be analyzed in detail by displaying the detail check image. An image stored as a sensing history is not filtered, and filtering processing is performed at the time of viewing the image.

Figure 15:
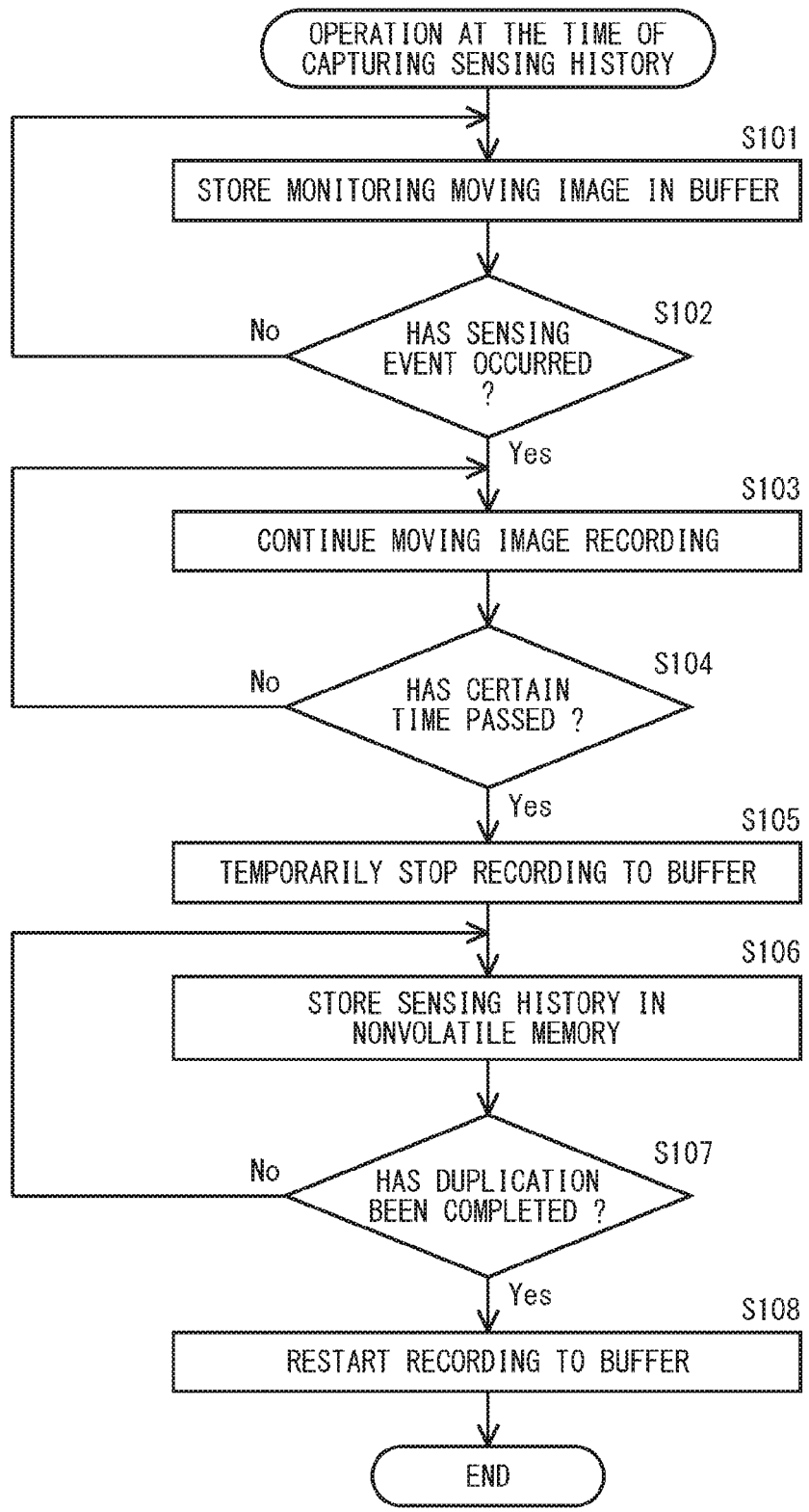
FIG. 15 is a flow chart illustrating an example of an operation at the time of capturing a sensing history in the display unit.

FIG. 15 including steps S101 to S108 is a flow chart illustrating an example of an operation at the time of capturing a sensing history in the display unit 11 of FIG. 4. First, the control part 41 acquires a monitoring image and a bank number from the measurement unit 12 and stores the acquired image and number in the buffer 46 (step S101). At this time, the control part 41 overwrites the oldest data when a certain number of data items are stored in the buffer 46. The bank number is recorded for each image frame in association with the image frame.

Then, when a sensing event has occurred (step S102), the control part 41 continues recording of the monitoring image and the bank number (S103). When a certain time has passed from the sensing event (step S104), the control part 41 temporarily stops recording to the buffer 46 (step S105). Then, the control part 41 reads a monitoring image and a bank number from the buffer 46 and stores the read monitoring image and bank number in the nonvolatile memory 47 as a sensing history (step S106). When duplication of the sensing history has been completed (step S107), the control part 41 restarts recording to the buffer 46 and ends the process (step S108).

According to the present embodiment, a monitoring image whose acquisition period includes a sensing time is stored as a sensing history. Thus, a peripheral state before and after the sensing time when an intruder is sensed can be easily identified by the sensing history. Thus, it is possible to easily identify whether or not an object has intruded, the sensing is a temporal sensing caused by dirt or ambient light, or the sensing is caused by a positional deviation at the time of installation of the measurement unit 12.

Further, a monitoring image having a certain time length including the sensing time is stored in association with the sensing position and the sensing time of an intruder. Thus, a monitoring image at the time of sensing the intruder can be easily found according to the position or the sensing time of the intruder. Further, the sensing history is stored in the nonvolatile memory 47. Thus, even when the main power of the display unit 11 is switched to an off state, loss of the sensing history can be prevented. Further, the sensing history is stored in the display unit 11. Thus, it is not necessary to constantly connect the setting support device 20 to the safety scanner 10.

Further, a camera image is stored as a sensing history. Thus, a peripheral state before and after the sensing time can be easily identified. For example, it is possible to easily identify what kind of intruder has intruded into the protection area or whether or not the intruder sensing is caused by a positional deviation at the time of installation of the safety scanner 10.

Although, in the present embodiment, there is described an example in which the sensing history is stored for each measurement unit 12, a mode of the sensing history of the present invention is not limited thereto. For example, when a plurality of measurement units 12 are connected to the display unit 11 in common, the measurement units 12 may be synchronized or cooperated, and a monitoring image that is acquired by the measurement unit 12 different from the measurement unit 12 that has sensed an intruder may be stored as a sensing history. Here, the measurement unit 12 that has sensed the intruder is referred to as a sensing unit. When such a configuration is employed, a camera image that is captured by the measurement unit 12 whose angle of view includes the sensing unit is stored as a sensing history. Thus, it is possible to facilitate an analysis of a sensing factor.

Although, in the present embodiment, there is described an example in which the two camera images 7a and 7b are displayed within the system screen 230 together with the scan image 6, a display mode of the camera image of the present invention is not limited thereto. For example, three or more camera images may be displayed within the system screen 230 together with the scan image 6. Further, when the measurement unit 12 is provided with a wide angle camera whose angle of view covers the scanning range of the detection light, one camera image captured by the wide angle camera may be displayed within the system screen 230 together with the scan image 6.

Although, in the present embodiment, there is described an example in which the safety scanner 10 generates the scan image 6, the setting support device 20 may generate the scan image 6 on the basis of distance measurement information acquired from the safety scanner 10 in the present invention.

Although, in the present embodiment, there is described an example in which the safety scanner 10 is provided with the fixed cameras 122 and 123, the present invention is also applicable to a safety scanner provided with no imaging section which captures an image of the protection area to generate a camera image.

What is claimed is:

1. A safety scanner comprising:
   a light emitter configured to emit a detection light to a detection area;
   a light receiver configured to receive the detection light reflected from an object within the detection area and configured to generate a light receiving signal in accordance with the detection light;
   a distance calculation section configured to determine a distance to the object on the basis of the light receiving signal;
   a scanner configured to direct the detection light to the detection area to scan the detection area in a circumferential direction around a rotation axis;
   an intrusion sensing section configured to sense the object within a protection area on the basis of a distance measurement information including the distance determined by the distance calculation section and a scanning angle of the detection light directed by the scanner;
   a monitoring image generater configured to generate a monitoring image for monitoring the protection area;
   a sensing history storage configured to store, as a sensing history, a position of the object sensed within the protection area by the intrusion sensing section, a sensing time corresponding to the position of the object sensed by the intrusion sensing section, and at least one of the monitoring image corresponding to the sensing time and a plurality of the distance measurement information obtained within a scanning period corresponding to the sensing time, in association with each other; and
   a sensing history transmitter configured to transmit the sensing history in accordance with a history request from an external device.

2. The safety scanner according to claim 1, wherein the monitoring image generater generates, as the monitoring image, a scan image that includes the plurality of distance measurement information obtained at each of the plurality of scanning angle of the detection light, the plurality of distance measurement information being represented as a plurality of distance measurement positions on a scanning plane of the detection light.

3. The safety scanner according to claim 1, wherein the monitoring image generater includes a fixed camera that captures an image of the protection area to generate a camera image as the monitoring image.

4. The safety scanner according to claim 1, wherein
   the monitoring image includes a moving image, and
   the sensing history storage stores, as the sensing history, the moving image of the monitoring image associated with an acquisition period including the sensing time of the object.

5. An optical safety system comprising:
   a light emitter configured to emit a detection light to a detection area;
   a light receiver configured to receive the detection light reflected from an object within the detection area and configured to generate a light receiving signal in accordance with the detection light;
   a distance calculation section configured to determine a distance to the object on the basis of the light receiving signal;
   a scanner configured to direct the detection light to the detection area to scan the detection area in a circumferential direction around a rotation axis;
   an intrusion sensing section configured to sense the object within a protection area on the basis of a distance measurement information including the distance determined by the distance calculation section and a scanning angle of the detection light directed by the scanner;
   a monitoring image generater configured to generate a monitoring image for monitoring the protection area;
   a sensing history storage configured to store, as a sensing history, a position of the object sensed within the protection area by the intrusion sensing section, a sensing time corresponding to the position of the object sensed by the intrusion sensing section, and at least one of the monitoring image corresponding to the sensing time and a plurality of the distance measurement information obtained within a scanning period corresponding to the sensing time, in association with each other; and
   a sensing history display configured to display the sensing history on a screen in accordance with a history display instruction.

6. A setting support device for a safety scanner,
   the safety scanner including:
   a light emitter configured to emit a detection light to a detection area;
   a light receiver configured to receive the detection light reflected from an object within the detection area and configured to generate a light receiving signal in accordance with the detection light;
   a distance calculation section configured to determine a distance to the object on the basis of the light receiving signal;
   a scanner configured to direct the detection light to the detection area to scan the detection area in a circumferential direction around a rotation axis;
   an intrusion sensing section configured to sense the object within a protection area on the basis of a distance measurement information including the distance determined by the distance calculation section and a scanning angle of the detection light directed by the scanner;
   a monitoring image generater configured to generate a monitoring image for monitoring the protection area;

a sensing history storage configured to store, as a sensing history, a position of the object sensed within the protection area by the intrusion sensing section, a sensing time corresponding to the position of the object sensed by the intrusion sensing section, and at least one of the monitoring image corresponding to the sensing time and a plurality of the distance measurement information obtained within a scanning period corresponding to the sensing time, in association with each other;

the setting support device comprising:

a sensing history acquisition section that acquires the sensing history from the safety scanner; and a sensing history display configured to display the sensing history on a screen in accordance with a history display instruction.

7. The setting support device for a safety scanner according to claim 6, wherein the sensing history display includes a history list display section that displays a history list including the plurality of sensing histories corresponding to each of the plurality of sensing times, the plurality of sensing histories being arrayed in the order of sensing time, and the history list display section displays, as a thumbnail image of the sensing history, a still image that constitutes the monitoring image and is acquired at the sensing time of the object in the history list.

8. The setting support device for a safety scanner according to claim 7, further comprising a reference history selection section that selects any one of sensing histories in the history list as a reference history in accordance with a user operation, wherein the sensing history display displays the monitoring image corresponding to the sensing history selected as the reference history.

9. The setting support device for a safety scanner according to claim 6, further comprising:

a monitoring image acquisition section that acquires a current monitoring image from the safety scanner; and a sensing position display displays the position of the object sensed in the past on the current monitoring image on the basis of the sensing history.

10. The setting support device for a safety scanner according to claim 6, wherein the monitoring image is a camera image captured by a fixed camera, and the sensing history display displays the protection area on the camera image.

11. The setting support device for a safety scanner according to claim 10, wherein the sensing history acquisition section acquires the sensing history including the plurality of distance measurement information obtained by scanning with the detection light from the safety scanner, and the sensing history display displays a plurality of distance measurement positions corresponding to the plurality of distance measurement information on the camera image.

12. The setting support device for a safety scanner according to claim 10, further comprising:

a display image generation section that generates a detail check image and a privacy image having a lower image quality than the detail check image for display; and a display image selection section that selects either the detail check image or the privacy image as a display image, wherein the sensing history display displays the display image selected by the display image selection section as the camera image, and the display image selection section selects the detail check image as the display image when user authentication is successful and selects the privacy image as the display image when user authentication is unsuccessful or a user is unauthenticated.

13. The setting support device for a safety scanner according to claim 10, further comprising a selection tab display section that displays a display target selection tab for selecting a measurement unit to be a display target, wherein the safety scanner being connected includes two or more measurement units, each of the measurement units includes the light emitter, the light receiver, the distance calculation section, the scanner, and the fixed camera, and the sensing history display displays the sensing history corresponding to the measurement unit selected by operating the display target selection tab.

* * * * *